US012248273B2

(12) United States Patent
Nakamura et al.

(10) Patent No.: US 12,248,273 B2
(45) Date of Patent: Mar. 11, 2025

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Nobuhiro Nakamura, Shizuoka (JP); Tomohito Ishida, Shizuoka (JP); Shuhei Iwasaki, Kanagawa (JP); Hiroyuki Watanabe, Shizuoka (JP); Fumiyuki Hiyama, Shizuoka (JP); Shuntaro Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 566 days.

(21) Appl. No.: 17/687,460

(22) Filed: Mar. 4, 2022

(65) Prior Publication Data

US 2022/0291600 A1 Sep. 15, 2022

(30) Foreign Application Priority Data

Mar. 10, 2021 (JP) ................................ 2021-038771
Sep. 30, 2021 (JP) ................................ 2021-161917

(51) Int. Cl.
*G03G 5/147* (2006.01)
*G03G 5/04* (2006.01)
*G03G 15/00* (2006.01)

(52) U.S. Cl.
CPC ............... *G03G 5/04* (2013.01); *G03G 15/75* (2013.01)

(58) Field of Classification Search
CPC .... G03G 5/005; G03G 5/147; G03G 5/14708; G03G 5/14734
See application file for complete search history.

(56) References Cited

U.S. PATENT DOCUMENTS 4,804,607 A 2/1989 Atsumi
2012/0251932 A1* 10/2012 Iwasaki ................. G03G 15/75 430/58.7

FOREIGN PATENT DOCUMENTS

EP 0473292 A 3/1992
EP 2019339 A1 1/2009
EP 1 817 635 * 7/2015 ............... G03G 5/10
JP 2010250355 A 11/2010
JP 2015161786 A 9/2015

OTHER PUBLICATIONS

Translation of EP 1 817 635.*

* cited by examiner

*Primary Examiner* — Peter L Vajda
(74) *Attorney, Agent, or Firm* — CANON U.S.A., INC. IP DIVISION

(57) ABSTRACT

In an electrophotographic photosensitive member, wrinkles have a convex portion in which a linear shape portion having a length of 50 μm or longer exists, the linear shape portion is parallel to any one of L1 to L150 and L1651 to L1800, and each of L1 to L1800 intersects with the convex portion at a plurality of places, and at least two of the places have different intersection angles; and when height information of the wrinkles is subjected to a frequency analysis, and a two-dimensional power spectrum is obtained, a one-dimensional radial distribution function has at least one local maximum value, and when an angular distribution is calculated from the spectrum at a frequency of the local maximum value, the power values have a particular relationship.

6 Claims, 6 Drawing Sheets

ELECTROPHOTOGRAPHIC PHOTOSENSITIVE MEMBER, PROCESS CARTRIDGE AND ELECTROPHOTOGRAPHIC APPARATUS

BACKGROUND OF THE INVENTION

Field of the Invention

The present disclosure relates to an electrophotographic photosensitive member; and a process cartridge and an electrophotographic apparatus each having the electrophotographic photosensitive member.

Description of the Related Art

As an electrophotographic photosensitive member mounted in a process cartridge and an electrophotographic apparatus, an electrophotographic photosensitive member containing an organic photoconductive material (charge generation substance) is used. In recent years, there has been a demand for an electrophotographic apparatus having a longer life, and because of this, it is desired to provide an electrophotographic photosensitive member that has an enhanced image quality and abrasion resistance (mechanical durability).

As a method for enhancing the abrasion resistance of the electrophotographic photosensitive member (hereinafter, also simply referred to as "photosensitive member"), such a technology has been proposed as to a use a radically polymerizable resin for a surface of the photosensitive member, form the surface layer of the photosensitive member into a cured layer, and thereby enhance a mechanical strength of the surface layer.

The electrophotographic photosensitive member is used in an electrophotographic image forming process that generally includes a charging step, an exposure step, a developing step, a transfer step and a cleaning step. Among the steps, the cleaning step of removing a residual toner on the electrophotographic photosensitive member after the transfer step is an important step for obtaining a clear image. As a method of this cleaning, a method is generally common that presses a rubber-like cleaning blade against the electrophotographic photosensitive member and scrapes off the toner.

However, in the above cleaning method, a frictional force is large between the cleaning blade and the electrophotographic photosensitive member; and accordingly chattering of the cleaning blade occurs, and an image defect tends to easily occur which originates in the cleaning. This problem of the cleaning blade becomes more remarkable as the mechanical strength of the surface layer of the electrophotographic photosensitive member enhances, in other words, as the peripheral surface of the electrophotographic photosensitive member resists being worn. In other words, this problem arises when the surface layer of the electrophotographic photosensitive member is formed as a cured layer, and the mechanical strength of the surface layer is enhanced, as described above. In addition, the surface layer of the organic electrophotographic photosensitive member is generally formed by an immersion application method in many cases, but the surface of the surface layer formed by the immersion application method (in other words, peripheral surface of electrophotographic photosensitive member) becomes highly smooth. Therefore, a contact area between the cleaning blade and the peripheral surface of the electrophotographic photosensitive member becomes large, a frictional resistance between the cleaning blade and the peripheral surface of the electrophotographic photosensitive member increases, and the above problem becomes remarkable.

As a method of overcoming the above-described problems, there has been proposed a method for enhancing a cleaning performance by providing an irregular shape on the surface of the photosensitive member to reduce the contact area between the outer surface of the electrophotographic photosensitive member and the cleaning blade, and thereby reducing the frictional force.

In Japanese Patent Application Laid-Open No. 2010-250355, there is disclosed a technology of a photosensitive member having a groove shape along a circumferential direction on an outer peripheral surface of the photosensitive member. In addition, in Japanese Patent Application Laid-Open No. 2015-161786, there is disclosed a technology of transferring circular irregular shapes of a mold member to the surface of a photosensitive member.

In recent years, a spherical toner having a small particle diameter has become a mainstream due to a rise in requirement for the image having a high definition and a high image quality. The spherical toner having a small particle diameter has a large adhesive force to the surface of the photosensitive member, and residual toner such as transfer residual toner which adheres to the surface tends to be insufficiently removed. When the irregular shapes are provided on the surface of the photosensitive member to reduce the frictional force, in order to solve this problem, a contact pressure of the cleaning blade can be enhanced, and the cleaning performance for the toner having the small particle diameter can be enhanced.

However, under an environment of high temperature and high humidity, the frictional force between the cleaning blade and the photosensitive member tends to easily enhance due to deformation or material characteristics of the cleaning blade. In addition, when the toner is repeatedly compressed in a recessed portion on the surface of the photosensitive member, the toner aggregates and causes fusion bonding of the toner on the surface of the photosensitive member, and an image defect (for example, white spot in solid image) which starts from the fusion-bonded toner tends to easily occur.

In the technology that is disclosed in Japanese Patent Application Laid-Open No. 2010-250355, under an environment of high temperature and high humidity, the frictional force between the cleaning blade and the photosensitive member becomes high, and there has been a case where such a cleaning failure occurs that the toner partially passes through the groove-shaped portion of the photosensitive member. In the technology that is disclosed in Japanese Patent Application Laid-Open No. 2015-161786, under an environment of high temperature and high humidity, the toner causes fusion bonding in a circular recessed portion on the surface of the photosensitive member, and there has been a case where a white spot occurs in the image.

SUMMARY OF THE INVENTION

Accordingly, an aspect of the present disclosure is to provide an electrophotographic photosensitive member that achieves both of suppression of passing of toner and suppression of fusion bonding of toner, even under an environment of high temperature and high humidity.

The above aspect is achieved by the following present disclosure. Specifically, an electrophotographic photosensitive member according to the present disclosure is an electrophotographic photosensitive member having a support and a photosensitive layer, wherein the electrophotographic photosensitive member has an outer surface having wrinkles; and when, on the outer surface, 76 square observation regions each having a side of 300 μm and a center point, are placed so that each of the center point is respectively on each of 76 points which are intersection between 19 line segments that divide the electrophotographic photosensitive member into 20 equal parts in an axial direction and 4 line segments that divide the electrophotographic photosensitive member into 4 equal parts in a circumferential direction, and so that a direction of each of the 76 square observation regions is set to a direction in which one side of each of the 76 square observation regions is parallel to the circumferential direction of the electrophotographic photosensitive member, and, when, in each of the 76 square observation regions, a line that passes through the center point and is parallel to a circumferential direction of the electrophotographic photosensitive member is designated as a first reference line L1, and 1799 reference lines that are obtained by rotating the first reference line around the center point at intervals of 0.1° are designated as L2 to L1800, respectively, a linear shape portion exists in a convex portion of the wrinkle, the wrinkles have a convex portion in which a linear shape portion having a length of 50 μm or longer exists, the linear shape portion being parallel to any one of the reference lines L1 to L150 and the reference lines L1651 to L1800, each of the reference lines L1 to L1800 intersects with the convex portion of the wrinkle at a plurality of places, and at least two places selected from the plurality of places have intersection angles different from each other; and when, in each of the observation regions, height information of the wrinkles is subjected to a frequency analysis, and a two-dimensional power spectrum F(r, θ) is obtained wherein r represents a frequency component and θ represents an angle component, a one-dimensional radial distribution function p(r) that is obtained by integrating the two-dimensional power spectrum F(r, θ) in a θ direction has at least one local maximum value, and when an angular distribution q(θ) is calculated from the two-dimensional power spectrum F(r, θ) with respect to a frequency rp at which the one-dimensional radial distribution function p(r) takes the local maximum value, a maximum value of power values in a range of θ=0° to 15° and a range of θ=165° to 180° is a power value that is 1.15 times or larger of an average value of power values in a range of θ=16° to 164°.

Further features of the present disclosure will become apparent from the following description of exemplary embodiments with reference to the attached drawings.

BRIEF DESCRIPTION OF THE DRAWINGS

FIG. 1A illustrates a top view of an outer surface of the electrophotographic photosensitive member, and FIG. 1B illustrates a graph illustrating height information obtained from surface observation of the outer surface of the electrophotographic photosensitive member.

FIG. 2A illustrates a view illustrating a two-dimensional power spectrum F(r, θ) obtained by a frequency analysis of wrinkles on the outer surface of the electrophotographic photosensitive member, FIG. 2B illustrates a view illustrating a one-dimensional radial distribution function that is obtained by integrating the two-dimensional power spectrum F(r, θ) in a θ direction, and FIG. 2C illustrates a view illustrating variations of power values in the whole θ range, at the time when an angular distribution q(θ) has been calculated from the two-dimensional power spectrum F(r, θ) with respect to the frequency rp at which a one-dimensional radial distribution function p(r) takes a local maximum value.

DESCRIPTION OF THE EMBODIMENTS

Figure 1A:
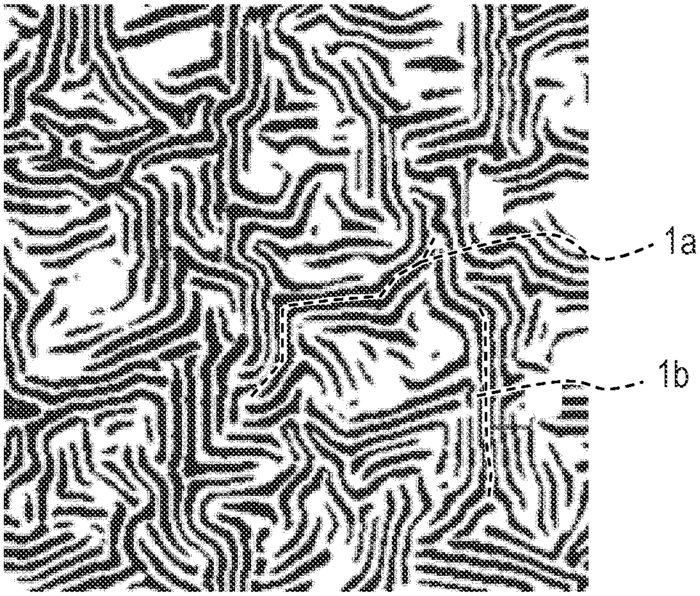
FIGS. 1A and 1B illustrate views each illustrating one example of irregular shapes of wrinkles which an electrophotographic photosensitive member according to the present disclosure has.

Preferred embodiments of the present disclosure will now be described in detail in accordance with the accompanying drawings.

The present disclosure will be described below in detail with reference to exemplary embodiments.

As a result of studies by the present inventors, it has been found that when a photosensitive member has been cleaned by a cleaning blade having an enhanced contact pressure under an environment of high temperature and high humidity, toner results in passing through a contact portion between a groove shape and the cleaning blade, in the case of the photosensitive member in which groove shapes parallel to a circumferential direction thereof are ranged. In addition, it has been found that in the case of a photosensitive member in which a groove shape orthogonal to the circumferential direction of the photosensitive member is provided, toner is repeatedly compressed in the groove shape when the photosensitive member is cleaned, and tends to aggregate to cause fusion bonding of the toner, and that image defects starting from the fusion-bonded toner tend to occur.

As a result of intensive studies, it has been found that both of toner passing and fusion bonding of the toner can be suppressed at a high level, due to predetermined wrinkle shapes being provided on an outer surface of an electrophotographic photosensitive member, which will be described below.

Specifically, the outer surface of the electrophotographic photosensitive member according to the present disclosure has wrinkles. The wrinkles in the present invention mean unevenness whose pattern is a pattern in which a plurality of mountain range-like convex portions (hereinafter, convex portion(s)) are arranged at intervals. And, on the outer surface, square observation regions are placed each having a side of 300 μm and having a center point being respectively 76 points of intersection between 19 line segments that divide the electrophotographic photosensitive member into 20 equal parts in an axial direction and 4 line segments that divide the electrophotographic photosensitive member into 4 equal parts in a circumferential direction, and a direction of the observation region is set to a direction in which one side of the square forming the observation region is parallel to the circumferential direction of the electrophotographic photosensitive member, wherein when a line that passes through a center point of the observation region and is parallel to a circumferential direction of the electrophotographic photosensitive member is designated as a first reference line L1, and when 1799 reference lines that are obtained by rotating the first reference line around the center point at intervals of 0.1° are designated as L2 to L1800, respectively, a linear shape portion exists in a convex portion of the wrinkle, the linear shape portion is a linear shape portion that is parallel to any one of the reference lines L1 to L150 and the reference lines L1651 to L1800 and that has a length of 50 μm or longer, each of the reference lines L1 to L1800 intersects with the convex portion of the wrinkle at a plurality of places, and at least two places selected from the plurality of places have intersection angles different from each other; and in the observation region, when height information of the wrinkles is subjected to a frequency analysis, and a two-dimensional power spectrum F(r, θ) is obtained wherein r represents a frequency component and θ represents an angle component, a one-dimensional radial distribution function p(r) that is obtained by integrating the two-dimensional power spectrum F(r, θ) in a θ direction has at least one local maximum value, and when an angular distribution q(θ) is calculated from the two-dimensional power spectrum F(r, θ) with respect to a frequency rp at which the one-dimensional radial distribution function p(r) takes the local maximum value, a maximum value of power values in a range of θ=0° to 15° and a range of θ=165° to 180° is a power value that is 1.15 times or larger of an average value of power values in a range of θ=16° to 164°.

The shape of the wrinkles on the outer surface of the electrophotographic photosensitive member according to the present disclosure will be specifically described below. The wrinkle according to the present disclosure has a certain level or higher of fineness, and has not less than a predetermined number of convex portions in a certain range. Specifically, firstly, on the outer peripheral surface of the photosensitive member, square observation regions are placed each having a side of 300 μm and having a center point being respectively 76 points of intersection between 19 line segments that divide the electrophotographic photosensitive member into 20 equal parts in an axial direction and 4 line segments that divide the electrophotographic photosensitive member into 4 equal parts in a circumferential direction, in such a direction that the one side is parallel to the circumferential direction of the photosensitive member. Subsequently, a line that passes through a center point of the observation region and is parallel to a circumferential direction of the photosensitive member is designated as a first reference line L1. In addition, 1799 reference lines that are obtained by rotating the first reference line around the center point at intervals of 0.1° are designated as L2 to L1800, respectively. At this time, the wrinkles on the outer surface of the electrophotographic photosensitive member have a sufficient number of convex portions to intersect with each of the reference lines L1 to L1800 at a plurality of places.

In addition, the wrinkles on the outer surface of the electrophotographic photosensitive member according to the present disclosure have a complicated shape, and the ridge lines of the convex portions point in various directions. Specifically, in each of the reference lines L1 to L1800, at least two places selected from a plurality of places each intersecting with the convex portions of the wrinkles have different intersection angles from each other.

Furthermore, in the ridge lines of the convex portions of the wrinkles, there exist a place that has a linear shape portion having a length parallel to any one of the reference lines L1 to L150 and the reference lines L1651 to L1800 of 50 μm or longer. Furthermore, it is more preferable that there exists a place which has a linear shape portion of 100 μm or longer.

Figure 1B:
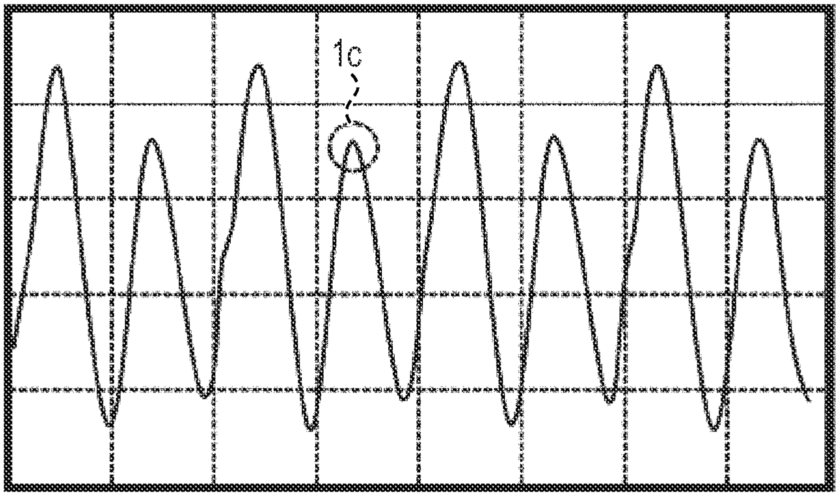

FIGS. 1A and 1B illustrate views each illustrating one example of irregular shapes of wrinkles which an electrophotographic photosensitive member according to the present disclosure has; and FIG. 1A illustrates a top view of an outer surface of the electrophotographic photosensitive member, and FIG. 1B illustrates a graph illustrating height information obtained from surface observation of the outer surface of the electrophotographic photosensitive member.

The wrinkles on the outer surface of the electrophotographic photosensitive member according to the present disclosure have a stripe-like irregular shape that can be observed on the outer surface of the electrophotographic photosensitive member, as is illustrated in FIG. 1A. The stripe shapes are not distributed in a single direction, but include a curved portion, a linear portion, an interrupted portion and a branched portion, and a plurality of stripe shapes exist in a square observation region having one side of 300 μm.

In addition, the ridge line of the wrinkle refers to a straight line or a curved line that is formed by connecting convex portions in the stripe-like irregular shape, when the outer surface of the electrophotographic photosensitive member is observed, as is illustrated in 1*a* and 1*b* in FIG. 1A.

A method of obtaining the ridge line by identifying the convex portion by surface observation on the outer surface of the electrophotographic photosensitive member is not particularly limited, but, for example, the convex portion can be identified from a result of an image analysis of the height information obtained by measurement with the use of a confocal laser microscope. An example is illustrated in FIG. 1B in which the height information thus obtained is plotted on positions on a straight line that is placed on the outer surface of the electrophotographic photosensitive member. A ridge line of the wrinkle having a curved line as indicated by 1*a* in FIG. 1A or a ridge line of the wrinkle having a straight line as indicated by 1*b* in FIG. 1A can be obtained by identification of the apex of the convex shape indicated by 1*c* in FIG. 1B.

Figure 8A:
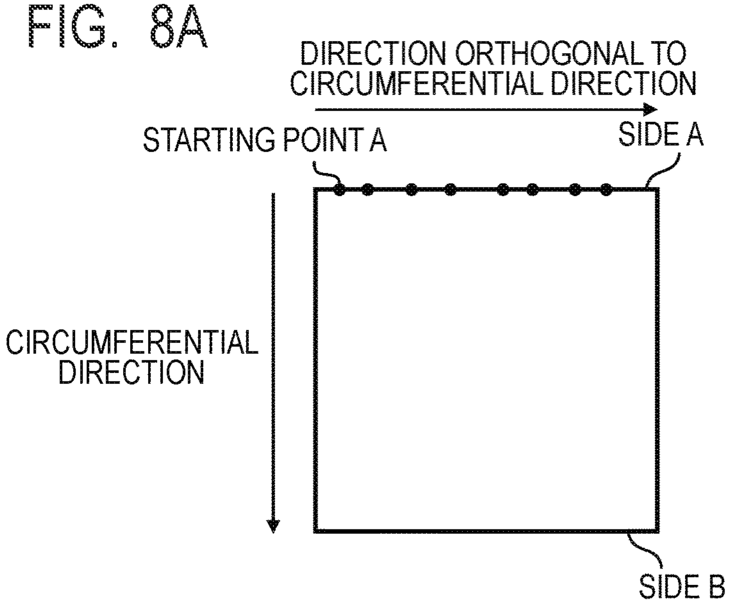
FIGS. 8A, 8B and 8C each illustrate views for describing a linear shape portion of convex portions of wrinkles.
Figure 8B:
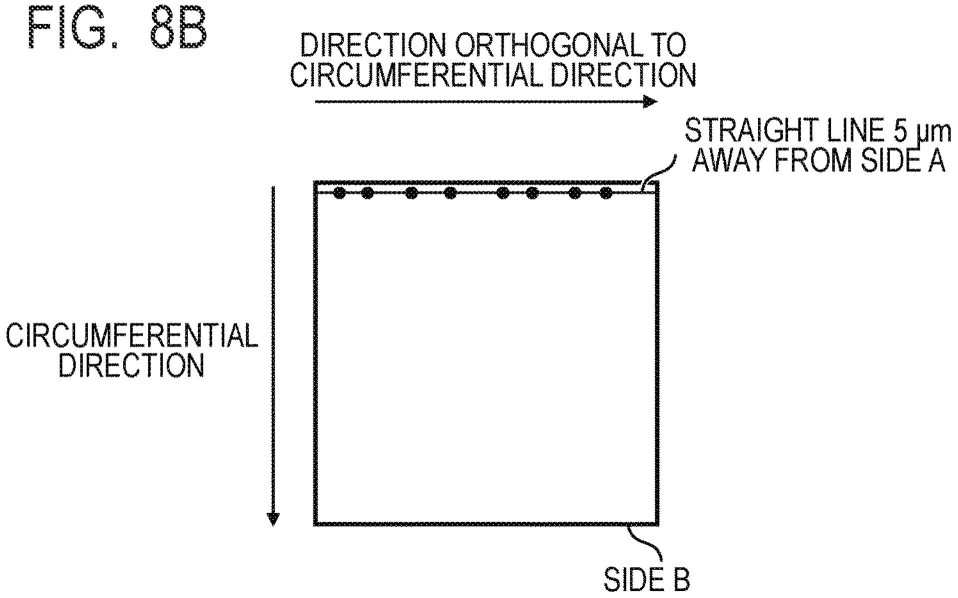
Figure 8C:
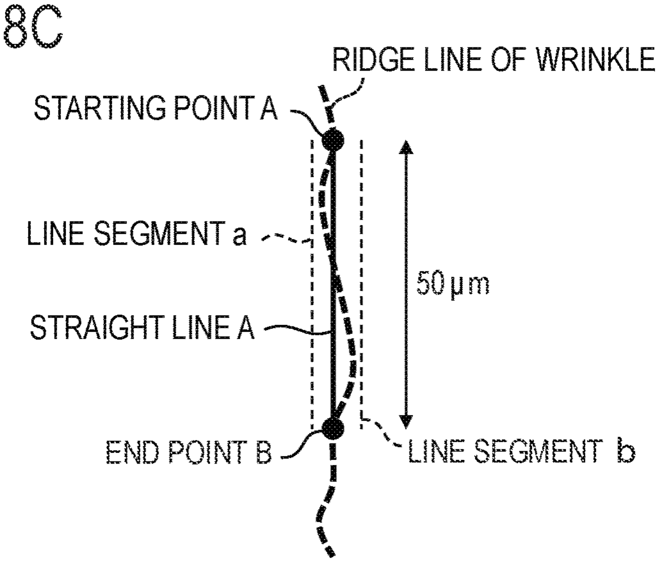

A method for determining whether the wrinkle has a linear shape portion having a length of 50 μm or longer will be described below with reference to FIG. 8A to FIG. 8C. As is shown in FIG. 8A, in the sides of the square which is the above observation region, any one of two sides perpendicular to the circumferential direction is designated as a side A, and the opposite side is designated as a side B. Next, an intersection between the side A and the ridge line of the wrinkle is determined. As is shown in FIG. 8C, the intersection is designated as a starting point A; and the point travels from the starting point A towards a direction of the side B along the ridge line, and detects an end point B which is located at a distance of 50 μm by a straight-line distance. A geometric straight-line A connecting the starting point A and the end point B is provided, and two line segments a and b are provided at positions which are separated by 2 μm from and parallel to the straight-line A. When the ridge line connecting the starting point A and the end point B is contained within a range between the line segments a and b, the ridge line is regarded as having a linear shape portion of 50 μm, which is indicated by the geometric straight-line A. In the case when a linear shape portion is continuously searched, a straight line is provided at a position which is separated by 5 μm from and is parallel to the side A as in FIG. 8B, an intersection of the straight line and the wrinkle is designated as a starting point A, and a linear shape portion of 50 μm is searched in the same manner as in the above description. After that, the straight line is shifted by 5 μm at a time, and the linear shape portion is repeatedly searched up to the side B. In a case where a linear shape portion of 100 μm or longer is searched, the same procedure as described above is performed except that the straight-line distance from the starting point A to the end point B is changed from 50 μm to 100 μm.

Figure 9A:
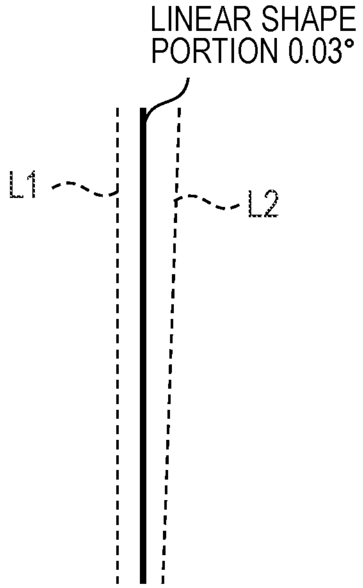
FIGS. 9A, 9B, 9C and 9D are views describing that the linear shape portion of the convex portions of the wrinkles is parallel to the reference line.
Figure 9B:
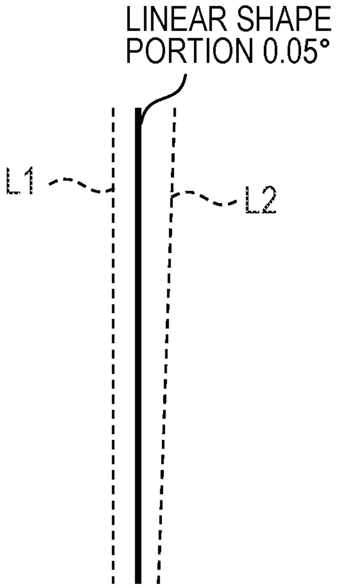
Figure 9C:
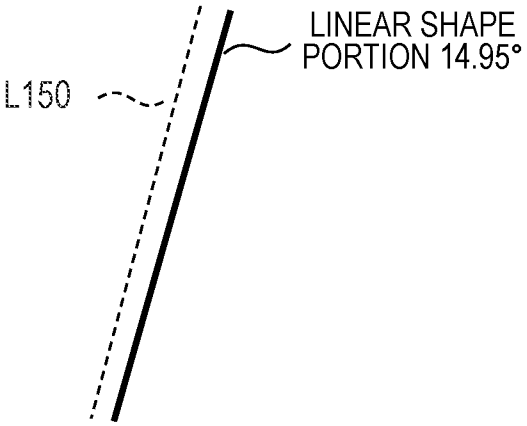
Figure 9D:
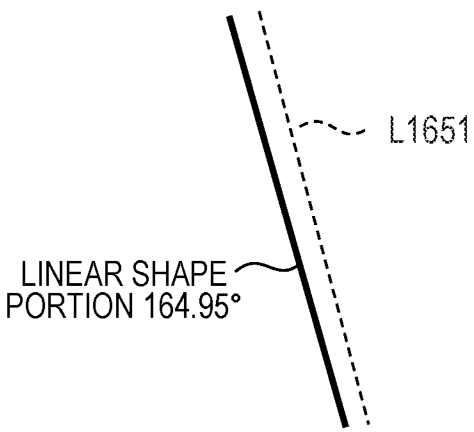

Next, a method for determining whether the linear shape portion is parallel to the reference lines L1 to L150 and the reference lines L1651 to L1800 will be described below. When the deviation of the angle between the linear shape portion and the reference line is contained within 0.05°, the linear shape portion and the reference line are regarded as being parallel. Specific examples are illustrated in FIG. 9A to FIG. 9D. In FIG. 9A, an angle of the linear shape portion is 0.03° with respect to the first reference line L1, and accordingly, the linear shape portion is parallel to the reference line L1. In FIG. 9B, an angle of the linear shape portion is 0.05° with respect to the first reference line L1, and accordingly the linear shape portion is parallel to the reference lines L1 and L2. In FIG. 9C, an angle of the linear shape portion is 14.95° with respect to the first reference line L1, and accordingly, the linear shape portion is parallel to the reference line L150. In FIG. 9D, an angle of the linear shape portion is 164.95° with respect to the first reference line L1, and accordingly, the linear shape portion is parallel to the reference line L1651. As described above, when the linear shape portion is 50 μm or longer and the deviation of the angle between the linear shape portion and each of the reference lines L1 to L150 and the reference lines L1651 to L1800 is 0.05° or smaller, the linear shape portions are regarded as being parallel to each other, and satisfy the requirement of the present disclosure.

In addition, in the present disclosure, a ridge line of a wrinkle has a plurality of curvatures in the ridge line. Curvature is a quantity that expresses a degree of bending of a curve, and when the vicinity of an arbitrary point on the curve is approximated by a circle, curvature X is obtained as the reciprocal of a radius R of the circle, as shown by expression (I).

$$\chi(s) = \frac{1}{R(s)} = \left|\frac{d^2 r}{ds^2}\right| \qquad \text{(I)}$$

wherein s represents the length of a portion corresponding to the arc of the curve, and r is a position vector of an arbitrary point on the curve.

Furthermore, the electrophotographic photosensitive member according to the present disclosure satisfies the following conditions.

Specifically, in the above observation region, when height information of the wrinkles is subjected to a frequency analysis, and a two-dimensional power spectrum F(r, θ) is obtained wherein r represents a frequency component and θ represents an angle component, a one-dimensional radial distribution function p(r) that is obtained by integrating the two-dimensional power spectrum F(r, θ) in a θ direction has at least one local maximum value, and when an angular distribution q(θ) is calculated from the two-dimensional power spectrum F(r, θ) with respect to a frequency rp at which the one-dimensional radial distribution function p(r) takes the local maximum value, a maximum value of power values in a range of θ=0° to 15° and a range of θ=165° to 180° is a power value that is 1.15 times or larger of an average value of power values in a range of θ=16° to 164°.

As a result of studies by the present inventors, it has been found that when the outer surface of the electrophotographic photosensitive member has wrinkles and the irregular shape of the wrinkles has a predetermined periodicity as illustrated in FIG. 1A, the effects of the present disclosure can be highly obtained.

Examples of methods for obtaining the periodicity of the irregular shape of wrinkles are not particularly limited, but include a method of obtaining height information from the surface observation of the outer surface of the electrophotographic photosensitive member, and then analyzing the obtained result with the use of two-dimensional Fourier transform.

Specifically, when the height information on the wrinkles is obtained by the number of data of N1×N2, and the height at an arbitrary point (n, m) in the plane is designated as hn,m, a two-dimensional power spectrum P(k, 1) which is obtained by discrete Fourier transform is given by the following expression (II).

$$P_{k,l} = \frac{1}{N_1 \cdot N_2}|f_{k,l}|^2 \qquad \text{(II)}$$

wherein fk,1 is given by the following expression (III), $$f_{k,l} = \sum_{n=0}^{N_1-1}\sum_{m=0}^{N_1-1} h_{n,m} e^{-ikn} e^{-ilm} \qquad \text{(III)}$$

wherein k and 1 are a frequency in the horizontal direction and a frequency in the vertical direction, respectively.

Furthermore, the two-dimensional power spectrum P(k, 1) obtained by the expression (II) is converted from an orthogonal coordinate system (k, 1) to a polar coordinate system (r, θ), and the converted power spectrum is expressed as the two-dimensional power spectrum F(r, θ). Here, r and θ satisfy the following expressions (IV) and (V), respectively.

$$r = \sqrt{k^2 + l^2} \qquad \text{(IV)}$$

-continued $$\theta = \tan^{-1}\left(\frac{l}{k}\right) \quad (V)$$

Note that in the present disclosure, in the square observation region having one side of 300 μm, the height information is used for an analysis, which has been obtained by measurement at a constant interval of 0.25 μm or smaller in each of two directions parallel to each side of the square.

Figure 2A:
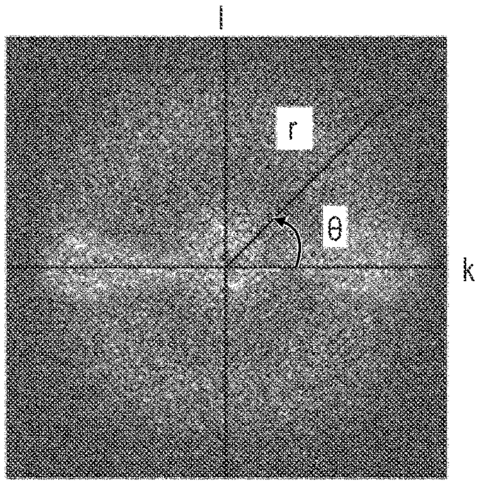
FIGS. 2A, 2B and 2C illustrate views each illustrating one example of results obtained by a numerical analysis of the electrophotographic photosensitive member according to the present disclosure.
Figure 2B:
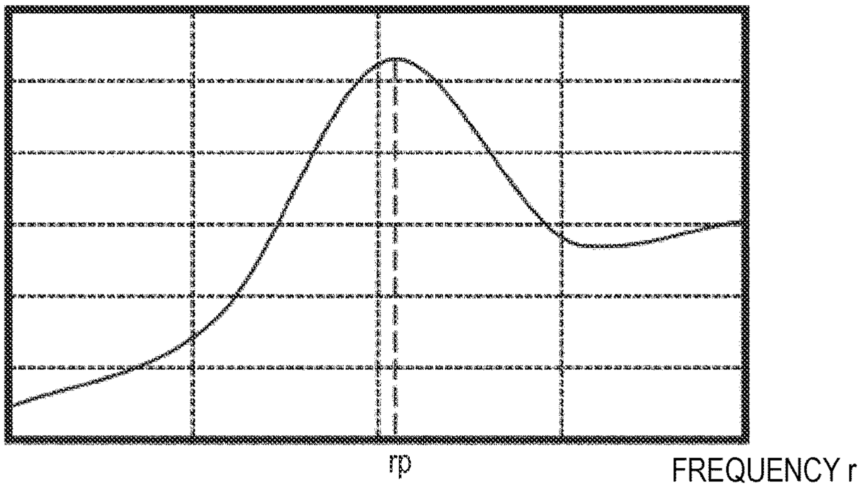
Figure 2C:
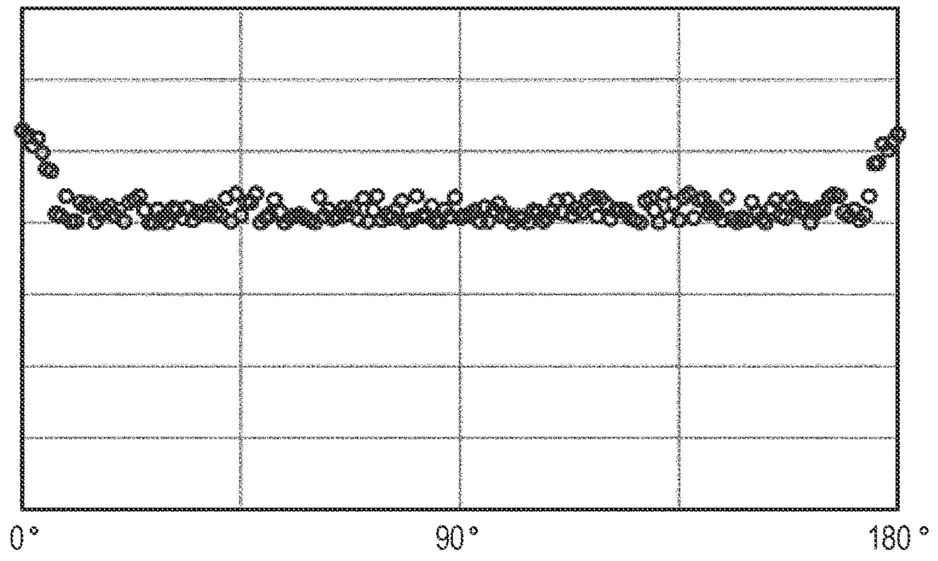

FIGS. 2A, 2B and 2C illustrate views each illustrating one example of a result obtained by a numerical analysis of the electrophotographic photosensitive member according to the present disclosure; and FIG. 2A illustrates a view illustrating the two-dimensional power spectrum F(r, θ) which has been obtained by subjecting the wrinkles on the outer surface of the electrophotographic photosensitive member, to the frequency analysis. In addition, FIG. 2B illustrates a view illustrating the one-dimensional radial distribution function that is obtained by integrating the obtained two-dimensional power spectrum F(r, θ) in the θ direction. In addition, FIG. 2C illustrates a view illustrating variations of power values in the whole θ range, at the time when the angular distribution q(θ) has been calculated from the two-dimensional power spectrum F(r, θ) with respect to the frequency rp at which the one-dimensional radial distribution function p(r) takes the local maximum value.

As is illustrated in FIG. 2B, in the electrophotographic photosensitive member according to the present disclosure, the radial distribution function p(r) which has been obtained by converting the two-dimensional power spectrum F(r, θ) into one dimension in a radial direction has at least one local maximum value. This means that irregularities of a plurality of wrinkles which the outer surface of the electrophotographic photosensitive member has are distributed at regular intervals.

In addition, as is illustrated in FIG. 2C, when an angular distribution q(θ) of F(rp, θ) is calculated with respect to the frequency rp at which the radial distribution function p(r) becomes locally maximum, a maximum value of power values in a range of θ=0° to 15° and a range of θ=165° to 180° is 1.15 times or larger of an average value of power values in a range of θ=16° to 164°. This condition means that in the above observation region, components extending in the circumferential direction among a plurality of ridge lines of the wrinkles which the outer surface of the electrophotographic photosensitive member has exist more than components in other directions. The ratio between the power values is preferably 1.15 times or larger and 1.35 times or smaller. If the ratio of the power values exceeds 1.35 times, the circumferential component becomes too many, and it becomes difficult to obtain a cleaning effect which is obtained by the ridge lines of the convex portions of a plurality of wrinkles pointing in various directions.

A detailed mechanism of the action by which the present disclosure exhibits its effects is assumed to be as follows.

Firstly, it is assumed that the wrinkles have not less than a predetermined number of convex portions in a certain range, thereby reduce the contact area at the time when the cleaning blade comes in contact with the electrophotographic photosensitive member, and reduce the frictional force. Furthermore, it is assumed that the ridge lines of the convex portions of the wrinkles point in various directions, and accordingly suppress the toner passing through the recessed portions at the time when the electrophotographic photosensitive member rotates. Furthermore, a certain amount or more of wrinkles exist which extend in the circumferential direction among the ridge lines pointing in various directions, and accordingly, a pressure which is applied to the toner by the cleaning blade escapes to the wrinkles in the circumferential direction and is dispersed. Because of this, it is assumed that the pressure is reduced which is continuously and excessively applied to the toner, and the occurrence of the fusion bonding of the toner is suppressed.

It is preferable that the frequency rp at which the above radial distribution function p(r) takes the local maximum value is in a range of 0.04 $\mu m^{-1}$ or higher and 0.25 $\mu m^{-1}$ or lower, because the toner passing tends to be easily suppressed at this rp. Furthermore, it is more preferable that the frequency rp at the time when the radial distribution function p(r) takes the local maximum value is 0.10 $\mu m^{-1}$ or higher and 0.25 $\mu m^{-1}$ or lower.

It is preferable that an arithmetic average roughness Ra of the wrinkles in the observation region is 0.03 μm or larger and 0.25 μm or smaller, because the toner passing tends to be easily suppressed. Furthermore, it is more preferable that the arithmetic average roughness Ra of the wrinkles is 0.03 μm or larger and 0.12 μm or smaller.

[Electrophotographic Photosensitive Member]

Examples of a method for producing an electrophotographic photosensitive member of the present disclosure include a method for preparing a coating liquid for each layer, which will be described later, applying the coating liquids in the order of desired layers, and drying the coating liquids. Examples of a method for applying the coating liquid at this time include, dip coating, spray coating, inkjet coating, roll coating, die coating, blade coating, curtain coating, wire bar coating and ring coating. Among the coating methods, the dip coating is preferable from the viewpoint of efficiency and productivity.

The support and each layer will be described below.

<Support>

In the present disclosure, the electrophotographic photosensitive member has a support. In the present disclosure, it is preferable that the support is an electroconductive support having electroconductivity. Examples of the shape of the support include a cylindrical shape, a belt shape and a sheet shape. Among the supports, the cylindrical support is preferable. In addition, the surface of the support may be subjected to electrochemical treatment such as anodic oxidation, blast treatment, cutting treatment and the like.

As a material of the support, a metal, a resin, glass and the like are preferable. Examples of the metal include aluminum, iron, nickel, copper, gold, stainless steel, and alloys thereof. Among the metals, an aluminum support using aluminum is preferable.

In addition, the electroconductivity may be imparted to the resin or the glass by treatment such as mixing of or coating with an electroconductive material.

<Electroconductive Layer>

In the present disclosure, an electroconductive layer may be provided on the support. By the electroconductive layer being provided, the support can conceal scratches and unevenness on its surface and can control the reflection of light on its surface.

It is preferable that the electroconductive layer contains an electroconductive particle and a resin.

Examples of a material of the electroconductive particle include a metal oxide, a metal, and carbon black.

Examples of the metal oxide include zinc oxide, aluminum oxide, indium oxide, silicon oxide, zirconium oxide, tin oxide, titanium oxide, magnesium oxide, antimony oxide and bismuth oxide. Examples of the metal include aluminum, nickel, iron, nichrome, copper, zinc and silver.

Among the materials, it is preferable to use a metal oxide as the electroconductive particle, and in particular, it is more preferable to use titanium oxide, tin oxide or zinc oxide.

When the metal oxide is used as the electroconductive particle, the surface of the metal oxide may be treated with a silane coupling agent or the like, or the metal oxide may be doped with an element such as phosphorus and aluminum, or an oxide thereof.

In addition, the electroconductive particle may have a layered structure having a core material particle and a covering layer with which the particle is covered. Examples of the core material particle include titanium oxide, barium sulfate and zinc oxide. Examples of the covering layer include a metal oxide such as tin oxide.

In addition, when the metal oxide is used as the electroconductive particle, the volume average particle diameter is preferably 1 nm or larger and 500 nm or smaller, and more preferably 3 nm or larger and 400 nm or smaller.

Examples of the resin include a polyester resin, a polycarbonate resin, a polyvinyl acetal resin, an acrylic resin, a silicone resin, an epoxy resin, a melamine resin, a polyurethane resin, a phenol resin and an alkyd resin.

In addition, the electroconductive layer may further contain a concealing agent such as a silicone oil, a resin particle and titanium oxide.

The average film thickness of the electroconductive layer is preferably 1 μm or larger and 50 μm or smaller, and particularly preferably 3 μm or larger and 40 μm or smaller.

The electroconductive layer can be formed by preparing a coating liquid for the electroconductive layer containing each of the above-described materials and a solvent, forming a coating film of the coating liquid, and drying the coating film. Examples of the solvent to be used for the coating liquid include an alcoholic solvent, a sulfoxide solvent, a ketone solvent, an ether solvent, an ester solvent and an aromatic hydrocarbon solvent. Examples of a dispersion method for dispersing the electroconductive particles in the coating liquid for the electroconductive layer include a method using a paint shaker, a sand mill, a ball mill, or a liquid collision type high-speed dispersion machine.

<Undercoat Layer>

In the present disclosure, an undercoat layer may be provided on the support or the electroconductive layer. The undercoat layer which is provided can thereby enhance an adhesion function between layers and impart a charge injection inhibition function.

It is preferable that the undercoat layer contains a resin. In addition, the undercoat layer may be formed as a cured film by polymerization of a composition which contains a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin and a cellulose resin.

Examples of the polymerizable functional group which the monomer having the polymerizable functional group has include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group and a carbon-carbon double bond group.

In addition, the undercoat layer may further contain an electron transport substance, a metal oxide, a metal, an electroconductive polymer and the like, for the purpose of enhancing the electric characteristics. Among the materials, it is preferable to use the electron transport substance and the metal oxide.

Examples of the electron transport substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound and a boron-containing compound. The undercoat layer may also be formed as a cured film, by using an electron transport substance having a polymerizable functional group, as the electron transport substance, and copolymerizing the electron transport substance with a monomer having the above described polymerizable functional group.

Examples of the metal oxide include indium tin oxide, tin oxide, indium oxide, titanium oxide, zinc oxide, aluminum oxide and silicon dioxide. Examples of the metal include gold, silver and aluminum.

In addition, the undercoat layer may also further contain an additive.

The average film thickness of the undercoat layer is preferably 0.1 μm or larger and 50 μm or smaller, more preferably 0.2 μm or larger and 40 μm or smaller, and particularly preferably 0.3 μm or larger and 30 μm or smaller.

The undercoat layer can be formed by preparing a coating liquid for the undercoat layer containing each of the above-described materials and a solvent, forming a coating film of the coating liquid, and drying and/or curing the coating film. Examples of the solvent to be used for the coating liquid include an alcoholic solvent, a ketone solvent, an ether solvent, an ester solvent and an aromatic hydrocarbon solvent.

<Photosensitive Layer>

A photosensitive layer of the electrophotographic photosensitive member is mainly classified into (1) a multilayer type photosensitive layer, and (2) a single-layer type photosensitive layer. The multilayer type photosensitive layer (1) includes a charge generation layer containing a charge generation substance, and a charge transport layer containing a charge transporting substance. (2) The single-layer type photosensitive layer has a photosensitive layer which contains both of the charge generation substance and the charge transporting substance. The present disclosure is preferably used for producing a photosensitive member having the multilayer type photosensitive layer.

(1) Multilayer Type Photosensitive Layer

The multilayer type photosensitive layer includes the charge generation layer and the charge transport layer.

(1-1) Charge Generation Layer

It is preferable that the charge generation layer contains a charge generation substance and a resin.

Examples of the charge generation substances include an azo pigment, a perylene pigment, a polycyclic quinone pigment, an indigo pigment and a phthalocyanine pigment. Among the pigments, the azo pigment and the phthalocyanine pigment are preferable. Among the phthalocyanine pigments, oxytitanium phthalocyanine pigment, chlorogallium phthalocyanine pigment and hydroxygallium phthalocyanine pigment are preferable.

The content of the charge generation substance in the charge generation layer is preferably 40% by mass or more and 85% by mass or less, and more preferably 60% by mass or more and 80% by mass or less, with respect to the total mass of the charge generation layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin and a polyvinyl chloride resin. Among the resins, the polyvinyl butyral resin is more preferable.

In addition, the charge generation layer may further contain additives such as an antioxidizing agent and an ultraviolet absorbing agent. Specific additives include a hindered phenol compound, a hindered amine compound, a sulfur compound, a phosphorus compound and a benzophenone compound.

The average film thickness of the charge generation layer is preferably 0.1 μm or larger and 1 μm or smaller, and more preferably 0.15 μm or larger and 0.4 μm or smaller.

The charge generation layer can be formed by preparing a coating liquid for the charge generation layer containing each of the above-described materials and a solvent, forming a coating film of the coating liquid, and drying the coating film. Examples of the solvent to be used for the coating liquid include an alcoholic solvent, a sulfoxide solvent, a ketone solvent, an ether solvent, an ester solvent and an aromatic hydrocarbon solvent.

(1-2) Charge Transport Layer

It is preferable that the charge transport layer contains a charge transporting substance and a resin.

Examples of the charge transporting substances include a polycyclic aromatic compound, a heterocyclic compound, a hydrazone compound, a styryl compound, an enamine compound, a benzidine compound, a triarylamine compound, and resins having a group derived from these substances. Among the substances, the triarylamine compound and the benzidine compound are preferable, and a compound represented by the formula (1) is suitably used.

(1)

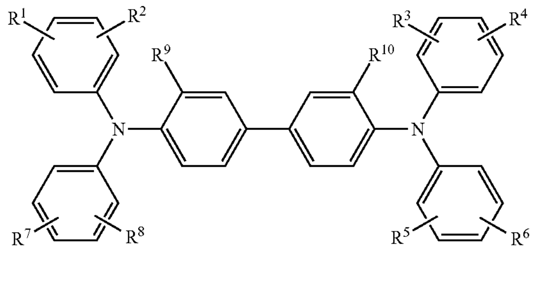

wherein $R^1$ to $R^{10}$ each independently represent a hydrogen atom or a methyl group.

Examples of the structure represented by the formula (1) are shown in the formulae (1-1) to (1-10). Among the formulae, structures represented by the formulae (1-1) to (1-6) are more preferable.

(1-1)

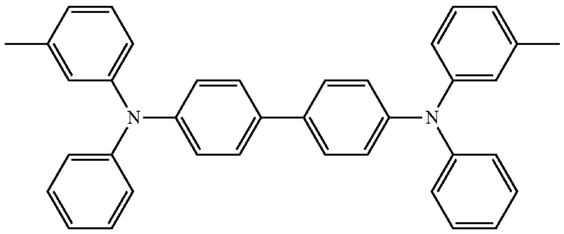

(1-2)

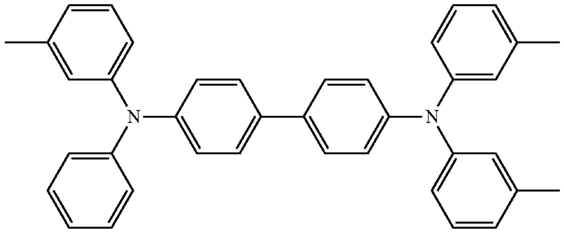

(1-3)

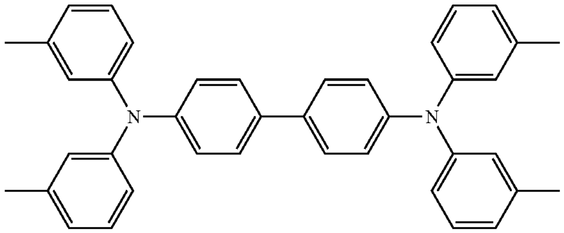

(1-4)

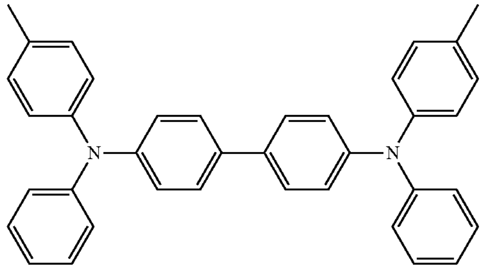

(1-5)

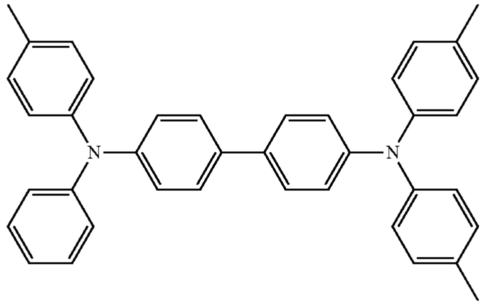

-continued (1-6)

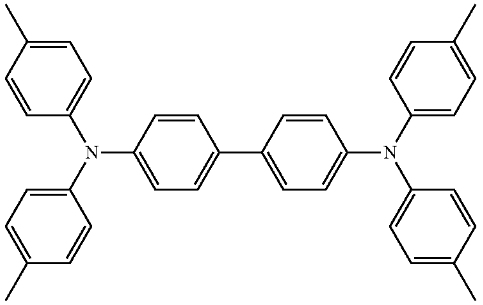

(1-7)

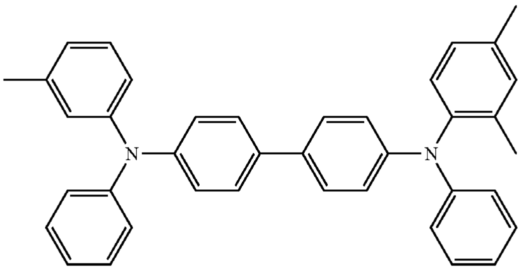

(1-8)

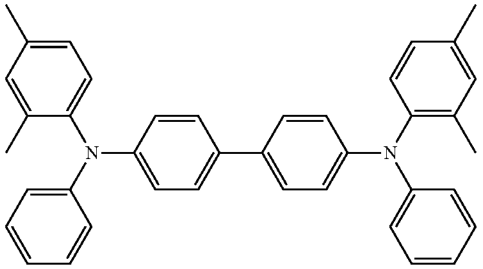

(1-9)

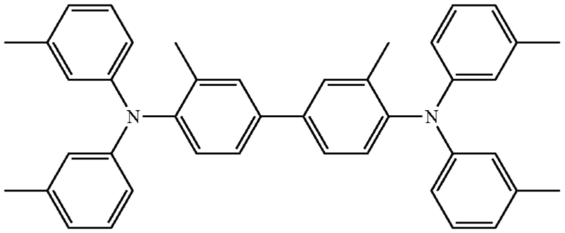

(1-10)

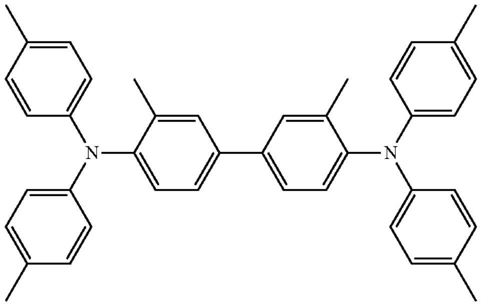

As the resin, a thermoplastic resin is used; and examples thereof include a polyester resin, a polycarbonate resin, an acrylic resin and a polystyrene resin. Among the resins, the polycarbonate resin and the polyester resin are preferable. As the polyester resin, a polyarylate resin is particularly preferable.

A content of the charge transporting substance in the charge transport layer is preferably 25% by mass or more and 70% by mass or less, and is more preferably 30% by mass or more and 55% by mass or less, with respect to the total mass of the charge transport layer.

A content ratio (mass ratio) between the charge transporting substance and the resin is preferably 4:10 to 20:10, and is more preferably 5:10 to 12:10.

In addition, the charge transport layer may contain additives such as an antioxidizing agent, an ultraviolet absorbing agent, a plasticizing agent, a leveling agent, a slipperiness imparting agent, and an abrasion resistance improver. The specific additives include a hindered phenol compound, a hindered amine compound, a sulfur compound, a phosphorus compound, a benzophenone compound, a siloxane modified resin, silicone oil, a fluorocarbon resin particle, a polystyrene resin particle, a polyethylene resin particle, a silica particle, an alumina particle and a boron nitride particle.

The average film thickness of the charge transport layer is preferably 5 μm or larger and 50 μm or smaller, more preferably 8 μm or larger and 40 μm or smaller, and particularly preferably 10 μm or larger and 30 μm or smaller.

(2) Single-Layer Type Photosensitive Layer

The single-layer type photosensitive layer can be formed by preparing a coating liquid for the photosensitive layer containing a charge generation substance, a charge transporting substance, a resin and a solvent; forming the coating film of the coating liquid; and drying the coating film. The charge generation substance, the charge transporting substance and the resin are the same as the examples of the materials in the above "(1) multilayer type photosensitive layer".

<Protective Layer>

In the present disclosure, a protective layer is provided on the photosensitive layer. The protective layer is formed as a cured film by the polymerization of a composition which contains a compound having a polymerizable functional group.

It is preferable that the protective layer further contains an electroconductive particle and/or a charge transporting substance, and a resin.

Examples of the electroconductive particles include particles of metal oxides such as titanium oxide, zinc oxide, tin oxide and indium oxide.

Examples of the charge transporting substance include a polycyclic aromatic compound, a heterocyclic compound, a hydrazone compound, a styryl compound, an enamine compound, a benzidine compound, a triarylamine compound, and resins having a group derived from these substances. Among the substances, the triarylamine compound and the benzidine compound are preferable.

Examples of the resin include a polyester resin, an acrylic resin, a phenoxy resin, a polycarbonate resin, a polystyrene resin, a phenol resin, a melamine resin and an epoxy resin. Among the resins, the polycarbonate resin, the polyester resin and the acrylic resin are preferable.

In addition, the protective layer may also be formed as a cured film by the polymerization of a composition which contains a monomer having a polymerizable functional group. Examples of the polymerizable functional group which the monomer having a polymerizable functional group has include an acryloyloxy group and a methacryloyloxy group. As a monomer having the polymerizable functional group, a material having charge transport capability may be used. As for a charge transporting structure, a triarylamine structure is preferable in terms of charge transport. The polymerizable functional group included in a material having charge transporting capability is preferably an acryloyloxy group or a methacryloyloxy group. The number of polymerizable functional groups included in the monomer having the polymerizable functional group may be one or more. Among the functional groups, it is particularly preferable to form a cured film by polymerizing a composition that contains both a compound having a plurality of polymerizable functional groups and a compound having one polymerizable functional group, because strains caused by polymerization of the plurality of functional groups tend to be easily eliminated.

Examples of the above compound having one polymerizable functional group are shown in (2-1) to (2-6).

(2-1)

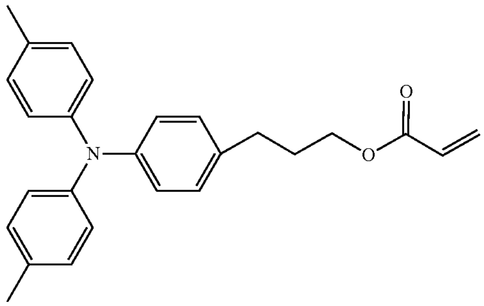

(2-2)

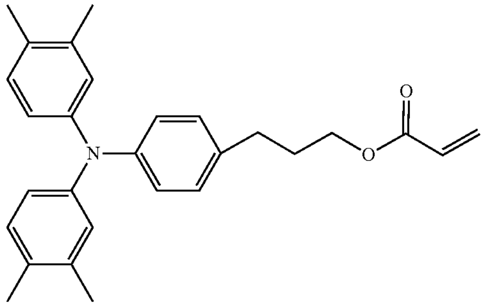

(2-3)

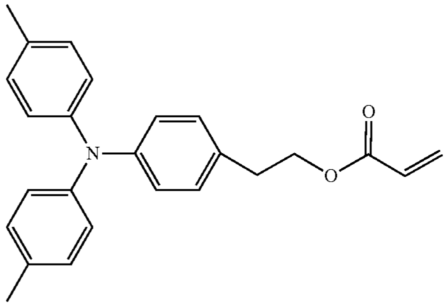

-continued (2-4)

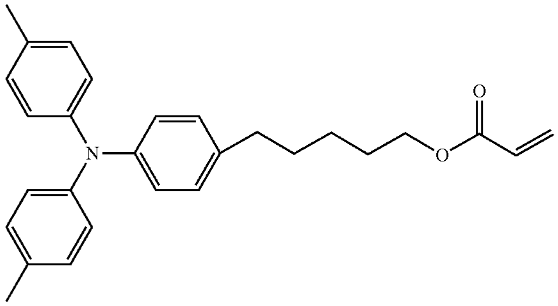

(2-5)

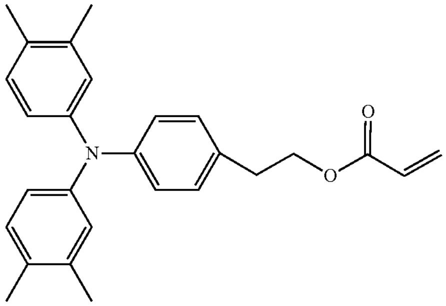

(2-6)

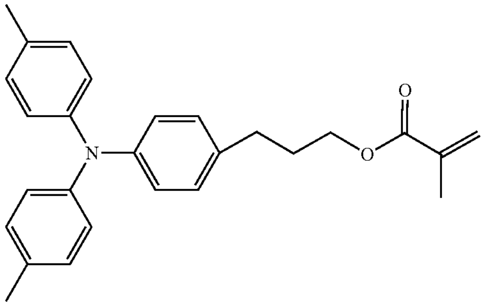

Examples of the above compound having a plurality of polymerizable functional groups are shown in (3-1) to (3-7).

(3-1)
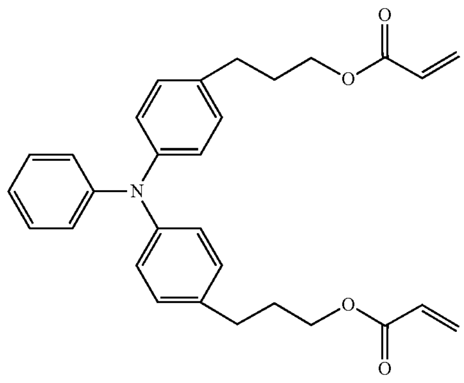
(3-2)
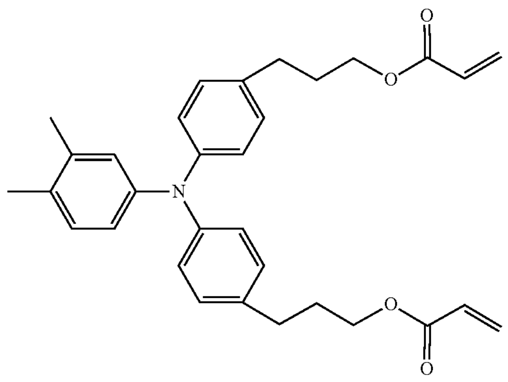
(3-3)
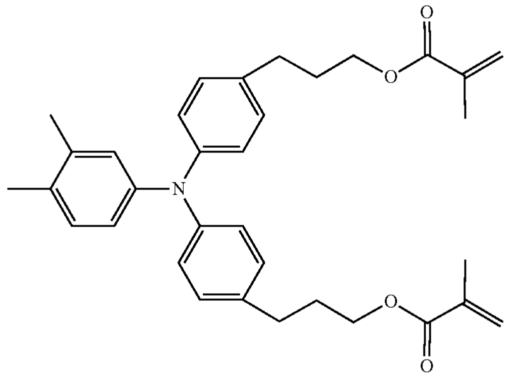
(3-4)
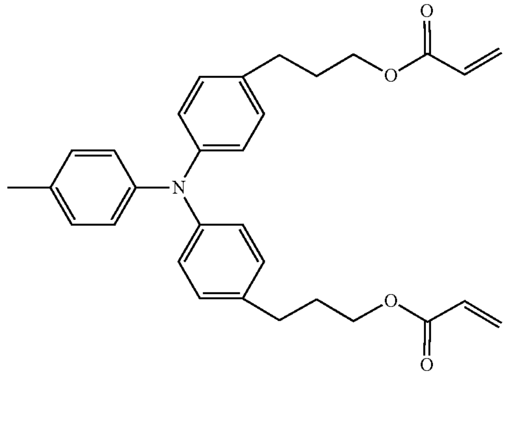

-continued (3-5)

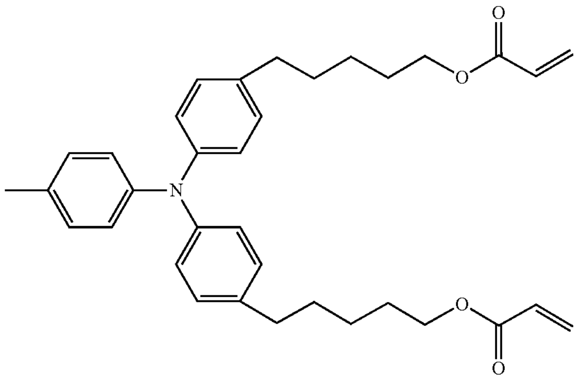

(3-6)

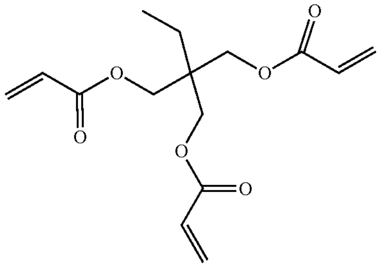

(3-7)

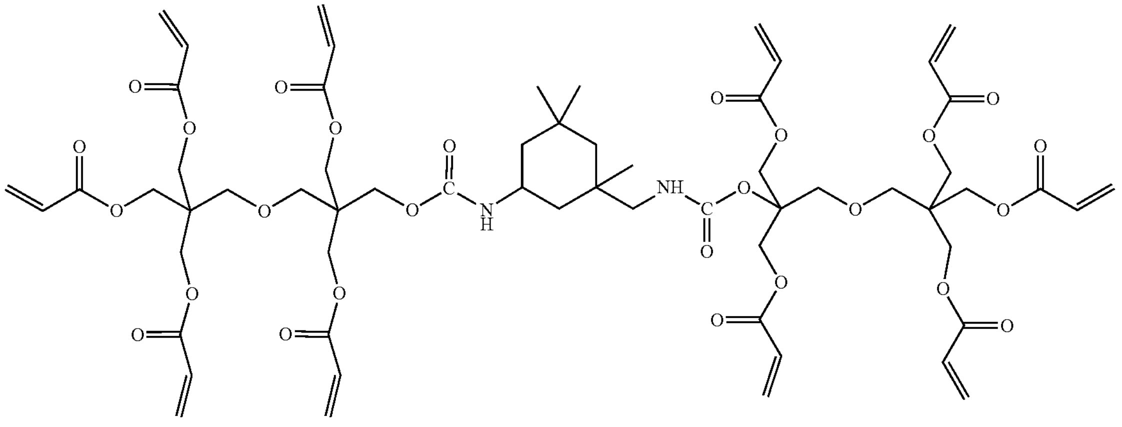

The protective layer may contain additives such as an antioxidizing agent, an ultraviolet absorbing agent, a plasticizing agent, a leveling agent, a slipperiness imparting agent and an abrasion resistance improver. The specific additives include a hindered phenol compound, a hindered amine compound, a sulfur compound, a phosphorus compound, a benzophenone compound, a siloxane modified resin, silicone oil, a fluorocarbon resin particle, a polystyrene resin particle, a polyethylene resin particle, a silica particle, an alumina particle and a boron nitride particle.

The average film thickness of the protective layer is preferably 0.2 μm or larger and 1.5 μm or smaller, and more preferably 0.2 μm or larger and 0.8 μm or smaller, in order that the wrinkle shape is finely and uniformly formed.

The protective layer can be formed by preparing a coating liquid for the protective layer containing each of the above-described materials and a solvent, forming a coating film of the coating liquid, and drying and/or curing the coating film. Examples of the solvent to be used for the coating liquid include an alcoholic solvent, a ketone solvent, an ether solvent, a sulfoxide solvent, an ester solvent and an aromatic hydrocarbon solvent.

<Method for Forming Wrinkle on Outer Surface of Electrophotographic Photosensitive Member>

A method for forming wrinkles on the outer surface of an electrophotographic photosensitive member in the present disclosure will be described below.

A protective layer which is a cross-linkable cured film is formed on the charge transport layer which includes a thermoplastic resin as a main component, in the case of a multilayer type of a photosensitive layer, or on a single-layer type photosensitive layer which includes a thermoplastic resin as a main component, in the case of the single-layer type of photosensitive layer. At this time, the surface of the charge transport layer or the single-layer type photosensitive layer before the protective layer is formed is subjected to rubbing treatment with abrasive paper, waste cloth or non-woven fabric, in the circumferential direction of the photosensitive member. Next, the protective layer is formed on the charge transport layer or the single-layer type photosensitive layer which has been subjected to the rubbing treatment, and then is subjected to heating treatment; and thereby, a fine wrinkle shape is formed.

For this reason, when the wrinkle shape is formed by the present method, the outer surface of the electrophotographic photosensitive member definitely becomes the surface of the protective layer which is provided directly on the photosensitive layer.

A mechanism by which the wrinkle shape is formed is considered to be that a compressive stress is applied to a surface direction due to a difference in a deformation amount between the protective layer and the charge transport layer or the single-layer type photosensitive layer at the time of heat treatment, the protective layer is buckled, and thereby the wrinkle shape is formed on the outer surface of the photosensitive member.

Figure 3:
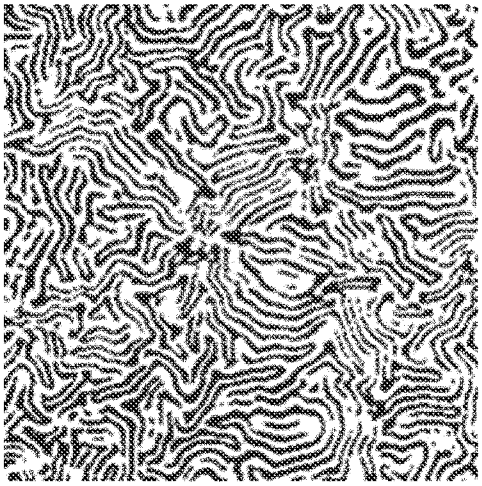
FIG. 3 illustrates a top view of an irregular shape of wrinkles in a case where the irregular shape does not have a convex portion which is parallel to reference lines L1 to L150 and reference lines L1651 to L1800.

When the wrinkle shape is formed by the heat treatment without performing the rubbing treatment, the whole surface of the photosensitive member tends to be uniformly buckled, and accordingly the ridge line of the wrinkle is formed randomly and isotropically, as is illustrated in the example of FIG. 3. On the other hand, it is considered that when the surface of the single-layer type photosensitive layer or the charge transport layer before the protective layer is formed is rubbed in the circumferential direction, and is subjected to heat treatment in a state in which fine scratches are formed in the circumferential direction, the protective layer tends to be easily buckled in the circumferential direction, and wrinkles are formed in a shape in which ridge lines of the wrinkles extend in the circumferential direction.

When rubbing the surface of the single-layer type photosensitive layer or the charge transport layer, it is preferable to form the scratches shallowly so that the surface upon formation of the protective layer becomes flat. A member for rubbing may be appropriately selected according to the hardness of the surface layer. For example, when rubbing the single-layer type photosensitive layer or the charge transport layer, it is preferable to rub the layer with a soft nonwoven fabric or the like. When the pressing pressure of the nonwoven fabric, the rubbing time, and the number of times are increased, the shapes of the wrinkles tend to be easily formed along the circumferential direction, and such a ridge line of the wrinkle tends to be formed as to have a linear shape portion of 100 μm or longer that is parallel to any one of the reference lines L1 to L150 and the reference lines L1651 to L1800.

If the scratches formed on the surface of the single-layer type photosensitive layer or the charge transport layer are too deep, the surface of the protective layer forms recessed portions before the wrinkles are formed when the protective layer is formed, and the irregular shape of the wrinkles changes greatly and the periodicity does not become uniform.

An example has been described in which the single-layer type photosensitive layer or the charge transport layer is subjected to rubbing treatment before the protective layer is formed, but the fine wrinkle shapes can also be formed by forming the protective layer on the charge transport layer or the single-layer type photosensitive layer and then subjecting the resultant layer to the rubbing treatment. Also in the case where the surface of the protective layer is rubbed to have scratches thereon, the rubbing member and rubbing conditions may be appropriately set so that the scratches become shallow.

It is preferable to set a heating temperature for generating wrinkles at a temperature which exceeds a boiling point of a residual solvent contained in the photosensitive layer. Furthermore, the heating temperature is more preferably 140° C. or higher and 230° C. or lower, though depending on the boiling point of the solvent to be used. When the heating temperature is set at a temperature exceeding the boiling point of the residual solvent, the residual solvent in the photosensitive layer rapidly evaporates, and the portion tends to easily become a starting point of the buckling due to the compressive stress; and the wrinkle shape tends to be finely and uniformly formed.

The photosensitive layer is formed by applying the coating liquid for the photosensitive layer to form a coated film for the photosensitive layer, and heating and drying the film. Examples of the solvent to be used for the coating liquid for the photosensitive layer include an alcoholic solvent, a ketone solvent, an ether solvent, an ester solvent and an aromatic hydrocarbon solvent. Specifically, the examples include toluene, xylene (including at least one selected from the group consisting of o-xylene, m-xylene and p-xylene), methyl benzoate, cyclohexanone, diethylene glycol monoethyl ether acetate, tetrahydrofuran and dimethoxymethane. It is preferable to use a combination of a solvent having a boiling point of 140° C. or higher and a solvent having a boiling point of 140° C. or lower, in order that a residual solvent appropriately remains in the photosensitive layer before being heated for forming the wrinkles.

A known method can be used for measuring the amount of the residual solvent, and for example, a gas chromatography can be used.

The coating liquid for the protective layer contains a compound having a chain-polymerizable functional group.

The protective layer is formed as a film that has been cured by applying the coating liquid for this protective layer onto the photosensitive layer, and polymerizing the compound having the chain-polymerizable functional group.

Examples of reactions of polymerizing a composition containing a monomer having a polymerizable functional group include methods for causing the polymerization with the use of heat, light (ultraviolet ray or the like), or radioactive rays (electron beam or the like). Among these, the radioactive rays are preferable, and among the radioactive rays, the electron beam is more preferable. The electron beam irradiation is preferably performed in a low oxygen atmosphere, in order to prevent the deactivation of radicalization of the polymerizable functional group. In addition, in order to sufficiently promote the polymerization in a short time and form a cured film, it is necessary to raise the temperature to some extent. The heating is preferably performed in a low oxygen atmosphere, in order to prevent the deactivation of radicalization of the polymerizable functional group and polymerize the composition promptly. It is acceptable to set the heating temperature at a temperature that does not exceed a boiling point of the residual solvent in the photosensitive layer, and specifically, 90° C. or higher and 130° C. or lower is preferable.

[Process Cartridge and Electrophotographic Apparatus]

A process cartridge of the present disclosure integrally supports the electrophotographic photosensitive member described above, and at least one unit selected from the group consisting of a charging unit, a developing unit and a cleaning unit, and is detachably attachable to a main body of an electrophotographic apparatus.

In addition, the electrophotographic apparatus of the present disclosure includes: the electrophotographic photosensitive member described above; and at least one unit selected from the group consisting of the charging unit, an exposure unit, the developing unit and a transfer unit.

Figure 4:
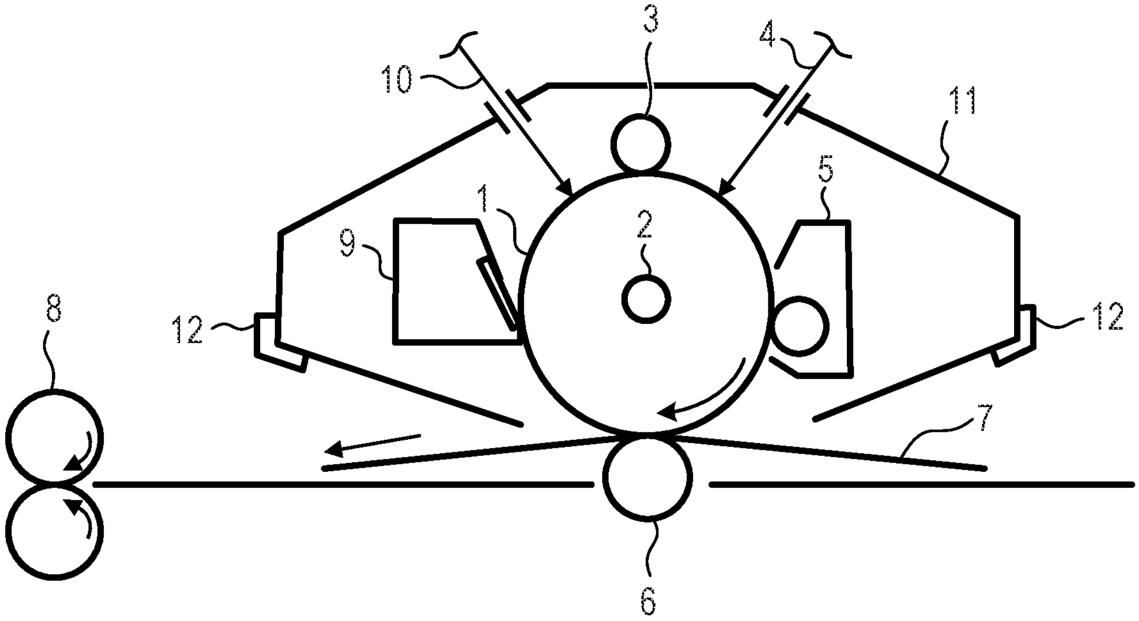
FIG. 4 illustrates a view illustrating a schematic configuration of an electrophotographic apparatus having a process cartridge provided with the electrophotographic photosensitive member.

FIG. 4 illustrates one example of a schematic configuration of the electrophotographic apparatus that has the process cartridge provided with the electrophotographic photosensitive member.

A cylindrical electrophotographic photosensitive member 1 is rotationally driven around a shaft 2 in a direction of an arrow at a predetermined circumferential velocity. The surface of the electrophotographic photosensitive member 1 is electrically charged to a predetermined positive or negative potential by a charging unit 3. For information, in FIG. 4, a roller charging system by a roller type charging member is illustrated, but a charging system such as a corona charging system, a proximity charging system or an injection charging system may also be adopted. The surface of the electrically charged electrophotographic photosensitive member 1 is irradiated with exposure light 4 emitted from an exposure unit (not illustrated), and an electrostatic latent image corresponding to objective image information is formed on the surface. The electrostatic latent image formed on the surface of the electrophotographic photosensitive member 1 is developed by a toner accommodated in a developing unit 5, and a toner image is formed on the surface of the electrophotographic photosensitive member 1. The toner image formed on the surface of the electrophotographic photosensitive member 1 is transferred onto a transfer material 7 by a transfer unit 6. The transfer material 7 onto which the toner image has been transferred is conveyed to a fixing unit 8, is subjected to fixing treatment of the toner image, and is printed out to the outside of the electrophotographic apparatus. The electrophotographic apparatus may have a cleaning unit 9 for removing an adherent such as a toner remaining on the surface of the electrophotographic photosensitive member 1 after transferring. Alternatively, the cleaning unit may not be separately provided, but a so-called cleanerless system may be used that removes the above adherent by a developing unit or the like. The electrophotographic apparatus may have a neutralization mechanism that subjects the surface of the electrophotographic photosensitive member 1 to neutralization treatment by pre-exposure light 10 emitted from a pre-exposure unit (not illustrated). In addition, a guide unit 12 such as a rail may also be provided in order to detachably attach the process cartridge 11 of the present disclosure to a main body of the electrophotographic apparatus.

The electrophotographic photosensitive member of the present disclosure can be used in a laser beam printer, an LED printer, a copying machine, a facsimile, a combined machine thereof and the like.

EXAMPLES

The present disclosure will be described below in more detail with reference to Examples and Comparative Examples. The present disclosure is not limited to the following Examples at all, as long as the present disclosure does not exceed the gist thereof. Herein, "part(s)" in the description of the following Examples is based on mass unless otherwise specified.

<Production of Electrophotographic Photosensitive Member>

Example 1

An aluminum cylinder (JIS-A3003, aluminum alloy) was used as a support (electroconductive support), which had a diameter of 24 mm and a length of 257.5 mm.

Next, the following materials were provided.

Titanium oxide ($TiO_2$) particles (average primary particle diameter 230 nm) which were coated with oxygen deficiency type tin oxide ($SnO_2$) that served as a metal oxide particle: 214 parts A phenol resin (monomer/oligomer of phenol resin) (trade name: PLYOPHEN J-325, produced by DIC Corporation, and resin solid content: 60% by mass), which served as a binder resin: 132 parts 1-Methoxy-2-propanol which served as solvent: 98 parts These materials were charged into a sand mill which used 450 parts of glass beads having a diameter of 0.8 mm, and then were subjected to dispersion treatment, under conditions of rotation speed: 2000 rpm, dispersion treatment time: 4.5 hours, and a set temperature of cooling water: 18° C.; and a dispersion liquid was obtained. The glass beads were removed from the dispersion liquid by a mesh (opening: 150 μm). To the obtained dispersion liquid, a silicone resin particle (trade name: Tospearl 120, produced by Momentive Performance Materials Inc., average particle diameter 2 μm) was added which served as a surface roughness imparting material. The amount of the silicone resin particles to be added was controlled to become 10% by mass with respect to the total mass of the metal oxide particle and the binder material in the dispersion liquid from which the glass beads were removed. In addition, silicone oil (trade name: SH28PA produced by Dow Corning Toray Co., Ltd.) which served as a leveling agent was added to the dispersion liquid so as to become 0.01% by mass, with respect to the total mass of the metal oxide particle and the binder resin in the dispersion liquid. Next, a mixed solvent of methanol and 1-methoxy-2-propanol (mass ratio 1:1) was added to the dispersion liquid so that the total mass (specifically, mass of solid content) of the metal oxide particle, the binder resin and the surface roughness imparting material in the dispersion liquid became 67% by mass with respect to the mass of the dispersion liquid. After that, the mixture was stirred, and a coating liquid for an electroconductive layer was prepared. The support was dip-coated with this coating liquid for the electroconductive layer, and the obtained coating film was heated at 140° C. for one hour to form the electroconductive layer having a film thickness of 30 μm.

Next, the following materials were provided.

Electron transport substance (formula E-1): 4 parts

Blocked isocyanate (trade name: Duranate SBN-70D, produced by Asahi Kasei Chemicals Corporation): 5.5 parts Polyvinyl butyral resin (S-LEC® KS-5Z, manufactured by Sekisui Chemical Co., Ltd.): 0.3 parts Zinc (II) hexanoate (Mitsuwa Chemicals Co., Ltd.) which served as a catalyst: 0.05 parts These materials were dissolved in a mixed solvent of 50 parts of tetrahydrofuran and 50 parts of 1-methoxy-2-propanol, and a coating liquid for an undercoat layer was prepared. The electroconductive layer was dip-coated with this coating liquid for the undercoat layer, and the resultant coating film was heated at 170° C. for 30 minutes to thereby form the undercoat layer having a film thickness of 0.7 μm.

(E-1)

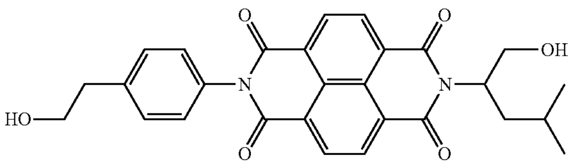

Next, 10 parts of hydroxygallium phthalocyanine with a crystal form, which had peaks at positions of 7.5° and 28.4° in a chart obtained from CuKα characteristic X-ray diffraction, and 5 parts of a polyvinyl butyral resin (trade name S-REC BX-1; produced by Sekisui Chemical Co., Ltd.) were provided. These substances were added to 200 parts of cyclohexanone, and were dispersed for 6 hours in a sand mill apparatus which used glass beads having a diameter of 0.9 mm Into the dispersion liquid, 150 parts of cyclohexanone and 350 parts of ethyl acetate were further added to dilute the dispersion liquid, and a coating liquid for a charge generation layer was obtained. The undercoat layer was dip-coated with the obtained coating liquid, the obtained coating film was dried at 95° C. for 10 minutes, and thereby the charge generation layer having a film thickness of 0.20 μm was formed.

For information, the X-ray diffraction measurement was performed under the following conditions.

[Powder X-Ray Diffraction Measurement]

Measuring machine used: X-ray diffraction apparatus RINT-TTRII manufactured by Rigaku Corporation.

X-ray tube: Cu

Tube voltage: 50 KV

Tube current: 300 mA

Scanning method: 2θ/θ scan

Scanning speed: 4.0°/min

Sampling interval: 0.02°

Start angle (2θ): 5.0°

Stop angle (2θ): 40.0°

Attachment: standard sample holder

Filter: not used

Incident monochromator: used

Counter monochromator: not used

Divergence slit: open

Diverging length limiting slit: 10.00 mm

Scattering slit: open

Light receiving slit: open

Flat plate monochromator: used

Counter: scintillation counter

Next, the following materials were provided.

A charge transporting substance (hole transporting substance) represented by the above structural formula (1-2): 5 parts A charge transporting substance (hole transporting substance) represented by the above structural formula (1-3): 5 parts Polycarbonate (trade name Iupilon Z400, produced by Mitsubishi Engineering-Plastics Corporation): 10 parts A polycarbonate resin having a copolymer unit of the following structural formula (C-4) and the following structural formula (C-5): 0.02 parts (x/y=0.95/0.05: viscosity-average molecular weight=20000)

These materials were dissolved in a mixed solvent of 60 parts of toluene/20 parts of methyl benzoate/20 parts of dimethoxymethane, and thereby a coating liquid for a charge transport layer was prepared. The charge generation layer was dip-coated with this coating liquid for the charge transport layer, and a coated film for the charge transport layer was formed; and the resulting coating film was dried at 120° C. for 30 minutes, and thereby the charge transport layer having a film thickness of 16 μm was formed.

(C-4)

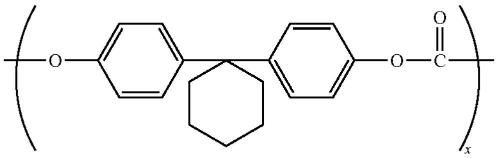

(C-5)

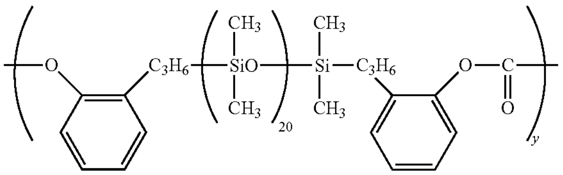

<Rubbing Treatment Method 1>

Next, Toraysee™ MK Sheet (produced by Toray Industries, Inc.) was used as a nonwoven fabric for rubbing. The nonwoven fabric was stretched so as not to be twisted, and the surface of the support on which layers up to the charge transport layer were formed was pushed in 3 mm from the position at which the surface just came in contact; and the support was rotated at 60 rpm for 1 second, and was rubbed in the circumferential direction.

Next, the following materials were provided.

A compound represented by the above structural formula (2-2): 8 parts

A compound represented by the above structural formula (3-1): 16 parts

Siloxane-modified acrylic compound (SYMAC® US270, produced by Toagosei Co., Ltd.): 0.1 parts These materials were mixed with 58 parts of cyclohexane and 25 parts of 1-propanol, and the mixture was stirred. Thus, a coating liquid for a protective layer was prepared.

The charge transport layer which was subjected to the rubbing treatment was dip-coated with this coating liquid for the protective layer, thereby a coated film for the protective layer was formed, and the obtained coating film was dried at 40° C. for 5 minutes. After that, under a nitrogen atmosphere, the coating film was irradiated with an electron beam for 1.6 seconds under conditions of an accelerating voltage of 70 kV and a beam current of 5.0 mA, while the support (object to be irradiated) was rotated at a speed of 300 rpm. The dose at the outermost layer position was 15 kGy. After that, the first heating was performed while raising the temperature from 25° C. to 100° C. over 20 seconds to form a cured film having a film thickness of 0.8 μm. A concentration of oxygen in a period between the electron-beam irradiation and the subsequent first heating treatment was 10 ppm or lower. Next, the coating film was naturally cooled until the temperature became 25° C. in the air, and then was subjected to second heating at 160° C. for 15 minutes in the air; and the protective layer was formed which had a wrinkle shape on the surface. In this way, a cylindrical (drum-shaped) electrophotographic photosensitive member having the protective layer of Example 1 was produced.

Examples 2 to 4, and 7 to 13

Electrophotographic photosensitive members of Examples 2 to 4 and 7 to 13 were produced in the same manner as in Example 1, except that the type of each compound to be used for forming the charge transport layer, the type of each compound to be used for forming the protective layer, and the rubbing conditions for the photosensitive layer were changed as shown in Table 1. Rubbing conditions 2 to 7 are shown below.

<Rubbing Condition 2>

The surface of the support was rubbed in a direction inclined by 15° with respect to the circumferential direction, in the same manner as in the rubbing condition 1, while the support was moved in the generatrix direction at 20 mm/s.

<Rubbing Condition 3>

The surface of the support was rubbed in a direction inclined by 15° with respect to the circumferential direction reversely to the direction in the rubbing condition 2, in the same manner as in the rubbing condition 2, while the support was moved in a reverse direction to that in the rubbing condition 2 at 20 mm/s.

<Rubbing Condition 4>

The surface of the support was rubbed in the circumferential direction in the same manner as in the rubbing condition 1, except that the push-in quantity was changed to 6 mm.

<Rubbing Condition 5>

The surface of the support was rubbed in a direction inclined by 15° with respect to the circumferential direction, in the same manner as in the rubbing condition 4, while the support was moved in the generatrix direction at 20 mm/s.

<Rubbing Condition 6>

The surface of the support was rubbed in a direction inclined by 15° with respect to the circumferential direction reversely to the direction in the rubbing condition 5, in the same manner as in the rubbing condition 5, while the support was moved in a reverse direction to that in the rubbing condition 5 at 20 mm/s.

<Rubbing Condition 7>

The surface of the support was rubbed in the circumferential direction in the same manner as in the rubbing condition 1, except that the push-in quantity was changed to 6 mm and the rotation time period was changed to 3 seconds.

Example 5

The type of each compound to be used for forming the charge transport layer and the type of each compound to be used for forming the protective layer were changed as shown in Table 1. An electrophotographic photosensitive member of Example 5 was produced in the same manner as in Example 1, except that the solvent of the coating liquid for the charge transport layer was changed to 60 parts of toluene/30 parts of cyclohexanone/10 parts of tetrahydrofuran, and the coating film was dried at 110° C. for 30 minutes.

Example 6

An electrophotographic photosensitive member before rubbing treatment was produced, in which the surface of the photosensitive layer was not subjected to the rubbing, and processes up to the first heating treatment for forming the protective layer were performed in the same manner as in Example 1. After that, the resultant electrophotographic photosensitive member was subjected to rubbing under rubbing conditions 8 described below, subsequently was subjected to the second heating at 160° C. for 15 minutes in the air to have a protective layer formed thereon which had a wrinkle shape on the surface; and an electrophotographic photosensitive member of Example 6 was produced.

<Rubbing Condition 8>

A lapping film sheet (count: 10000, abrasive grain: WA, produced by Sankyo Rikagaku Co., Ltd.) was used as an abrasive sheet for rubbing. The sheet was stretched so as not to be twisted, and the surface of the support on which layers up to the protective layer were formed was pressed by 2 mm from the position at which the surface just came in contact with the sheet; and the support was rotated at 60 rpm for 1 second, and the surface of the support was rubbed in the circumferential direction.

Comparative Example 1

An electrophotographic photosensitive member of Comparative Example 1 was produced in the same manner as in Example 1, except that the type of each compound to be used for forming the charge transport layer, the type of each compound to be used for forming the protective layer, and the rubbing condition for the photosensitive layer were changed as shown in Table 1. Rubbing condition 9 performed in Comparative Example 1 is shown below.

<Rubbing Condition 9>

The surface of the support was rubbed in a direction inclined by 45° with respect to the circumferential direction in the same manner as in the rubbing condition 1, while the support was moved in the generatrix direction at 72 mm/s.

Comparative Example 2

An electrophotographic photosensitive member of Comparative Example 2 was produced in the same manner as in Example 1, except that the type of each compound to be used for forming the charge transport layer, and the type of each compound to be used for forming the protective layer were changed as shown in Table 1, and the rubbing treatment was not performed.

Comparative Example 3

Figure 5:
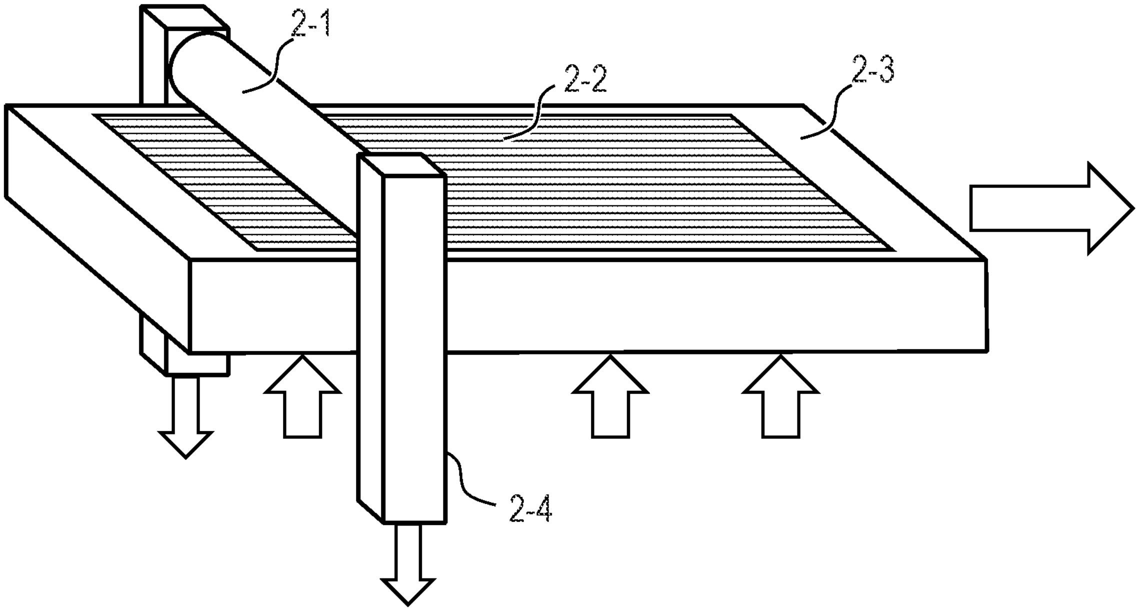
FIG. 5 illustrates a view illustrating a polishing machine that is used for polishing an outer surface of an electrophotographic photosensitive member in a Comparative Example.

An electrophotographic photosensitive member having no wrinkle was provided, in which the type of each compound to be used for forming the charge transport layer, and the type of each compound to be used for forming the protective layer were changed as shown in Table 1, and when the protective layer was formed, the second heating treatment was not performed. For this electrophotographic photosensitive member, the outer surface of the electrophotographic photosensitive member was subjected to polishing using a polishing machine shown in FIG. 5 under the following conditions.

Feeding speed of polishing sheet: 400 mm/min

Number of rotations of electrophotographic photosensitive member: 240 rpm

Polishing abrasive grain: silicon carbide

Average particle diameter of polishing abrasive grains: 3 μm

Polishing time period: 20 seconds

Figure 6:
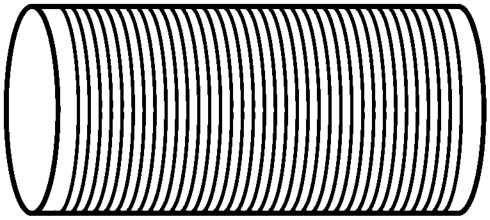
FIG. 6 illustrates a schematic view illustrating a shape of an outer surface of an electrophotographic photosensitive member according to a Comparative Example.

As the polishing sheet, a sheet-shaped base material 2-3 was used on which such a layer 2-2 was provided that polishing abrasive grains were dispersed in a binder resin. The electrophotographic photosensitive member 2-1 was pressed vertically against the face of the polishing sheet by a vertical mechanism 2-4 for 20 seconds while the polishing sheet was fed in parallel with the face of the polishing sheet and the member 2-1 was rotated, and the outer surface of the electrophotographic photosensitive member was subjected to roughening treatment. Thereby, an electrophotographic photosensitive member according to Comparative Example 3 was produced which had a plurality of groove shapes extending in the circumferential direction of the electrophotographic photosensitive member and parallel to each other on the outer surface, as shown in FIG. 6.

Comparative Example 4

Figure 7:
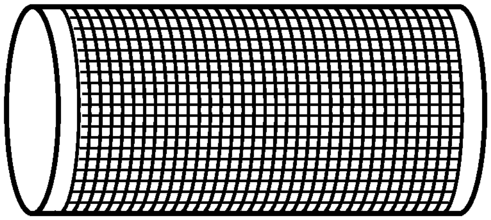
FIG. 7 illustrates a schematic view illustrating a shape of an outer surface of an electrophotographic photosensitive member according to a Comparative Example.

An electrophotographic photosensitive member having no wrinkle was provided, in which the type of each compound to be used for forming the charge transport layer, and the type of each compound to be used for forming the protective layer were changed as shown in Table 1, and when the protective layer was formed, the second heating treatment was not performed. After that, the resultant electrophotographic photosensitive member was subjected to the same surface roughening treatment as that in Comparative Example 3. Next, the electrophotographic photosensitive member 2-1 was fixed, and the polishing sheet was sent in parallel to the axial direction of the electrophotographic photosensitive member 2-1, and the outer surface of the electrophotographic photosensitive member 2-1 was subjected to roughening treatment. This surface roughening treatment was repeated while the angle of the rotation direction of the electrophotographic photosensitive member 2-1 was changed. Thereby, an electrophotographic photosensitive member according to Comparative Example 4 was produced which had groove shapes formed in a grid pattern on the outer surface of the electrophotographic photosensitive member as shown in FIG. 7.

<Evaluation>

Next, the surface shape of wrinkles on the outer surface of the electrophotographic photosensitive member was evaluated under the following conditions, with the use of the electrophotographic photosensitive members produced in Examples 1 to 13 and the electrophotographic photosensitive members produced in Comparative Examples 1 to 4.

[Surface Shape Analysis 1]

The surface shapes of square observation regions on the outer surface of the electrophotographic photosensitive member were enlarged and observed with a laser microscope (VK-X200, manufactured by Keyence Corporation), the square observation regions each having a side of 300 μm and a center point being respectively 76 points of intersection between 19 line segments that divide the electrophotographic photosensitive member into 20 equal parts in an axial direction and 4 line segments that divide the electrophotographic photosensitive member into 4 equal parts in a circumferential direction. Subsequently, a first reference line L1 was provided which passed through the center point of the observation region and was parallel to the circumferential direction of the electrophotographic photosensitive member, for the image including the irregular shape of wrinkles, which was obtained by the observation. Furthermore, reference lines L1 to L1800 were provided which were obtained by rotating the first reference line at intervals of 0.1° around the center point of the observation region.

After that, the following conditions 1, 2 and 3 were verified; and a case where all the observation regions satisfied the conditions was determined as A, and a case where any one of the observation regions did not satisfy the conditions was determined as B.

Condition 1: Each of the reference lines L1 to L1800 intersects with the convex portions of the wrinkles at a plurality of places, and at least two places selected from the plurality of intersecting places have intersection angles different from each other.

Condition 2: There exists a place in which the convex portion of the wrinkle has a linear shape portion of 50 μm that is parallel to any one of the reference lines L1 to L150 and the reference lines L1651 to L1800.

Condition 3: There exists a place in which the convex portion of the wrinkle has a linear shape portion of 100 μm that is parallel to any one of the reference lines L1 to L150 and the reference lines L1651 to L1800.

The results are shown in Table 2.

[Surface Shape Analysis 2]

An arithmetic average roughness Ra of wrinkles in the square observation region having a side of 300 μm was determined, which was obtained in the above surface shape analysis 1. Ra was designated as Ra on the reference line L900. The results of the average values of Ra are shown in Table 2, which were obtained in all the observation regions.

[Surface Shape Analysis 3]

The height information on the wrinkles, which was obtained in the above surface shape analysis 2, was subjected to a frequency analysis, and a two-dimensional power spectrum F(r, θ) was obtained. Next, a radial distribution function p(r) was calculated by converting the two-dimensional power spectrum F(r, θ) into one dimension in a radial direction, and a frequency rp was obtained at which p(r) became locally maximum.

Further, the angle distribution q(θ) of F(rp, θ) was obtained for the frequency rp at which the p(r) became locally maximum, and the ratio of the maximum value of a power value in a range of θ=0° to 15° and a range of θ=165° to 180° to the average value of the power values in a range of θ=16° to 164° was obtained.

The results of the average values were shown in Table 2, which were obtained in all observation regions.

As for the position of a peak of the power value in each example, Examples 1 to 6, 8, 10 and 11 had the peak of the power value at 0° and 180°. Examples 9 and 13 had the peak of the power value at 15°. Examples 7 and 12 had the peak at 165°. Comparative Example 1 had the peak of the power value at 45°. In Comparative Example 2, there was no clear peak of the power value.

[Evaluation of Cleanability]

A modified machine of a laser beam printer manufactured by Hewlett-Packard Company and having a trade name HP Laser Jet Enterprise Color M553dn was used as the electrophotographic apparatus. As for modified points, firstly, a contact pressure of the cleaning blade against the electrophotographic photosensitive member was changed to 120% of the product condition. In addition, the apparatus was modified so as to be capable of adjusting and measuring a voltage to be applied to a charging roller, and adjusting and measuring an amount of image exposure light.

The photosensitive members of Examples 1 to 13 and Comparative Examples 1 to 4 were each mounted on a cyan cartridge of an image forming apparatus.

Subsequently, in a high-temperature and high-humidity environment of 30° C. and 80% RH, an image having a printing ratio of 5% was output onto 100 sheets of plain paper of A4 size. As the charging condition, the dark portion potential was adjusted to −500V, and as the exposure condition, the amount of the image exposure light was adjusted to 0.25 μJ/cm$^2$. Subsequently, a solid white image was continuously printed out on 10 sheets, then a solid black image was further output on 10 sheets, and right after that, a halftone image was used for the evaluation. Specifically, streaks in the halftone image were visually counted, which occurred due to toner passing due to a cleaning failure, and were evaluated according to the following criteria.

A: There is no streak on an image quality and the image quality is satisfactory.
B: Very slight streaks occur.
C: Slight streaks occur.
D: A streak occurs in a part of the image.
E: Streaks occur in the whole image.

The results are shown in Table 2.

[Evaluation of Fusion Bonding of Toner]

Subsequently to the above evaluation of the cleanability, a test of continuously outputting an image of a 2-dot line/200-dot space horizontal line on ten thousand sheets was performed with the use of A4 paper, under the high-temperature and high-humidity environment of 30° C. and 80% RH. Subsequently to the continuous output test, a solid black image was output. The output image was visually observed, and the number of white spots was checked which existed within a distance of one perimeter of the electrophotographic photosensitive member.

The evaluation criteria for the white spots due to the fusion bonding of the toner are as follows.

A: No white spot.
B: One white spot
C: 2 to 4 white spots
D: 5 or more white spots The results are shown in Table 2.

TABLE 1

| Example | Charge transport layer: Charge transporting substance Type | | Protective layer: Monomer having polymerizable functional group Type | | Protective layer: Film thickness (μm) | Rubbing condition |
|---|---|---|---|---|---|---|
| Example 1 | (1-2) | (1-3) | (2-2) | (3-1) | 0.8 | 1 |
| Example 2 | (1-1) | (1-2) | (2-2) | (3-1) | 0.8 | 1 |
| Example 3 | (1-1) | (1-4) | (2-2) | (3-1) | 0.8 | 1 |
| Example 4 | (1-3) | (1-5) | (2-2) | (3-5) | 0.8 | 1 |
| Example 5 | (1-4) | (1-6) | (2-1) | (3-4) | 0.8 | 1 |
| Example 6 | (1-2) | (1-3) | (2-2) | (3-1) | 0.8 | 8 |
| Example 7 | (1-1) | (1-2) | (2-2) | (3-1) | 0.8 | 2 |
| Example 8 | (1-2) | (1-4) | (2-1) | (3-4) | 0.5 | 1 |
| Example 9 | (1-1) | (1-4) | (2-1) | (3-4) | 0.5 | 3 |
| Example 10 | (1-2) | (1-3) | (2-1) | (3-5) | 0.5 | 4 |
| Example 11 | (1-2) | (1-3) | (2-1) | (3-5) | 0.5 | 7 |
| Example 12 | (1-1) | (1-4) | (2-4) | (3-4) | 0.5 | 5 |
| Example 13 | (1-1) | (1-4) | (2-6) | (3-4) | 0.5 | 6 |
| Comparative Example 1 | (1-1) | (1-2) | (2-4) | (3-4) | 0.8 | 9 |
| Comparative Example 2 | (1-4) | (1-5) | (2-1) | (3-3) | 0.8 | — |
| Comparative Example 3 | (1-1) | (1-2) | (2-1) | (3-4) | 0.5 | — |
| Comparative Example 4 | (1-1) | (1-2) | (2-1) | (3-4) | 0.5 | — |

TABLE 2

| Example | Analysis of surface shape: Analysis 1 Condition 1 | Analysis 1 Condition 2 | Analysis 1 Condition 3 | Analysis 2 rp ($\mu m^{-1}$) | Analysis 3 Ra (μm) | Analysis 3 Ratio between power values | Evaluation of electrophotographic characteristics: Cleaning performance | White spot |
|---|---|---|---|---|---|---|---|---|
| Example 1 | A | A | B | 0.07 | 0.13 | 1.16 | B | B |
| Example 2 | A | A | B | 0.06 | 0.15 | 1.16 | B | B |
| Example 3 | A | A | B | 0.06 | 0.16 | 1.17 | B | B |
| Example 4 | A | A | B | 0.07 | 0.14 | 1.17 | B | B |
| Example 5 | A | A | B | 0.04 | 0.25 | 1.16 | B | B |
| Example 6 | A | A | B | 0.05 | 0.20 | 1.16 | B | B |
| Example 7 | A | A | B | 0.07 | 0.15 | 1.15 | B | B |
| Example 8 | A | A | B | 0.12 | 0.08 | 1.16 | A | B |
| Example 9 | A | A | B | 0.20 | 0.05 | 1.15 | A | B |
| Example 10 | A | A | A | 0.25 | 0.03 | 1.23 | A | A |
| Example 11 | A | A | A | 0.13 | 0.10 | 1.35 | A | A |
| Example 12 | A | A | A | 0.10 | 0.12 | 1.22 | A | A |
| Example 13 | A | A | A | 0.13 | 0.10 | 1.2 | A | A |
| Comparative Example 1 | A | B | B | 0.07 | 0.18 | 1.09 | B | C |
| Comparative Example 2 | A | B | B | 0.05 | 0.20 | 1.05 | B | C |

TABLE 2-continued

| | Analysis of surface shape | | | | | | Evaluation of electrophotographic characteristics | |
|---|---|---|---|---|---|---|---|---|
| | Analysis 1 | | | Analysis 2 | | Analysis 3 | | |
| Example | Condition 1 | Condition 2 | Condition 3 | rp ($\mu m^{-1}$) | Ra ($\mu m$) | Ratio between power values | Cleaning performance | White spot |
| Comparative Example 3 | B | A | A | 0.20 | 0.06 | — | C | A |
| Comparative Example 4 | B | A | A | 0.21 | 0.06 | — | C | D |

According to the present disclosure, an electrophotographic photosensitive member can be provided that achieves both of suppression of passing of the toner and suppression of the fusion bonding of the toner, even under an environment of high temperature and high humidity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-038771, filed Mar. 10, 2021, and Japanese Patent Application No. 2021-161917, filed Sep. 30, 2021, which are hereby incorporated by reference herein in their entirety.

What is claimed is:

1. An electrophotographic photosensitive member comprising:

a support;

a photosensitive layer; and an outer surface having wrinkles, wherein when, on the outer surface, 76 square observation regions each having a side of 300 μm and a center point, are placed so that each of the center point is respectively on each of 76 points which are intersection between 19 line segments that divide the electrophotographic photosensitive member into 20 equal parts in an axial direction and 4 line segments that divide the electrophotographic photosensitive member into 4 equal parts in a circumferential direction, and so that a direction of each of the 76 square observation regions is set to a direction in which one side of each of the 76 square observation regions is parallel to the circumferential direction of the electrophotographic photosensitive member, and, when, in each of the 76 square observation regions, a line that passes through the center point and is parallel to a circumferential direction of the electrophotographic photosensitive member is designated as a first reference line L1, and 1799 reference lines that are obtained by rotating the first reference line around the center point at intervals of 0.1° are designated as L2 to L1800, respectively, a linear shape portion exists in a convex portion of the wrinkle, the wrinkles have a convex portion in which a linear shape portion having a length of 50 μm or longer exists, the linear shape portion being parallel to any one of the reference lines L1 to L150 and the reference lines L1651 to L1800, each of the reference lines L1 to L1800 intersects with the convex portion at a plurality of places, and at least two places selected from the plurality of places have intersection angles different from each other; and when, in each of the observation regions, height information of the wrinkles is subjected to a frequency analysis, and a two-dimensional power spectrum F(r, θ) is obtained, wherein r represents a frequency component and θ represents an angle component, a one-dimensional radial distribution function p(r) that is obtained by integrating the two-dimensional power spectrum F(r, θ) in a θ direction has at least one local maximum value, and when an angular distribution q(θ) is calculated from the two-dimensional power spectrum F(r, θ) with respect to a frequency rp at which the one-dimensional radial distribution function p(r) takes the local maximum value, a maximum value of power values in a range of θ=0° to 15° and a range of θ=165° to 180° is a power value that is 1.15 times or larger of an average value of power values in a range of θ=16° to 164°.

2. The electrophotographic photosensitive member according to claim 1, wherein the frequency rp is in a range of 0.04 $\mu m^{-1}$ or higher and 0.25 $\mu m^{-1}$ or lower.

3. The electrophotographic photosensitive member according to claim 1, wherein an arithmetic average roughness Ra of the wrinkles in the observation region is 0.03 μm or larger and 0.25 μm or smaller.

4. The electrophotographic photosensitive member according to claim 1, wherein in the 76 square observation regions, the wrinkles have the convex portion in which a linear shape portion having a length of 100 μm or longer exists, the linear shape portion being parallel to any one of the reference lines L1 to L150 and the reference lines L1651 to L1800.

5. A process cartridge comprising and integrally-supporting:

an electrophotographic photosensitive member comprising a support and a photosensitive layer, and at least one unit selected from the group consisting of a charging unit, a developing unit and a cleaning unit, and the process cartridge being detachably attachable to a main body of an electrophotographic apparatus, wherein the electrophotographic photosensitive member has an outer surface having wrinkles; and when, on the outer surface, 76 square observation regions each having a side of 300 μm and a center point, are placed so that each of the center point is respectively on each of 76 points which are intersection between 19 line segments that divide the electrophotographic photosensitive member into 20 equal parts in an axial direction and 4 line segments that divide the electrophotographic photosensitive member into 4 equal parts in a circumferential direction, and so that a direction of each of the 76 square observation regions is set to a direction in which one side of each of the 76 square observation regions is parallel to the circumferential direction of the electrophotographic photosensitive member, and, when, in each of the 76 square observation regions, a line that passes through the center point and is parallel to a circumferential direction of the electrophotographic photosensitive member is designated as a first reference line L1, and 1799 reference lines that are obtained by rotating the first reference line around the center point at intervals of 0.1° are designated as L2 to L1800, respectively, a linear shape portion exists in a convex portion of the wrinkle, the wrinkles have a convex portion in which a linear shape portion having a length of 50 μm or longer exists, the linear shape portion being parallel to any one of the reference lines L1 to L150 and the reference lines L1651 to L1800, each of the reference lines L1 to L1800 intersects with the convex portion of the wrinkle at a plurality of places, and at least two places selected from the plurality of places have intersection angles different from each other; and when, in each of the observation regions, height information of the wrinkles is subjected to a frequency analysis, and a two-dimensional power spectrum F(r, θ) is obtained wherein r represents a frequency component and θ represents an angle component, a one-dimensional radial distribution function p(r) that is obtained by integrating the two-dimensional power spectrum F(r, θ) in a θ direction has at least one local maximum value, and when an angular distribution q(θ) is calculated from the two-dimensional power spectrum F(r, θ) with respect to a frequency rp at which the one-dimensional radial distribution function p(r) takes the local maximum value, a maximum value of power values in a range of θ=0° to 15° and a range of θ=165° to 180° is a power value that is 1.15 times or larger of an average value of power values in a range of θ=16° to 164°.

6. An electrophotographic apparatus comprising:

an electrophotographic photosensitive member comprising: a support and a photosensitive layer; and a charging unit, an exposure unit, a developing unit and a transfer unit, wherein the electrophotographic photosensitive member has an outer surface having wrinkles; and when, on the outer surface, 76 square observation regions each having a side of 300 μm and a center point, are placed so that each of the center point is respectively on each of 76 points which are intersection between 19 line segments that divide the electrophotographic photosensitive member into 20 equal parts in an axial direction and 4 line segments that divide the electrophotographic photosensitive member into 4 equal parts in a circumferential direction, and so that a direction of each of the 76 square observation regions is set to a direction in which one side of each of the 76 square observation regions is parallel to the circumferential direction of the electrophotographic photosensitive member, and, when, in each of the 76 square observation regions, a line that passes through the center point and is parallel to a circumferential direction of the electrophotographic photosensitive member is designated as a first reference line L1, and 1799 reference lines that are obtained by rotating the first reference line around the center point at intervals of 0.1° are designated as L2 to L1800, respectively, a linear shape portion exists in a convex portion of the wrinkle, the wrinkles have a convex portion in which a linear shape portion having a length of 50 μm or longer exists, the linear shape portion being parallel to any one of the reference lines L1 to L150 and the reference lines L1651 to L1800, each of the reference lines L1 to L1800 intersects with the convex portion of the wrinkle at a plurality of places, and at least two places selected from the plurality of places have intersection angles different from each other; and when, in each of the observation regions, height information of the wrinkles is subjected to a frequency analysis, and a two-dimensional power spectrum F(r, θ) is obtained wherein r represents a frequency component and θ represents an angle component, a one-dimensional radial distribution function p(r) that is obtained by integrating the two-dimensional power spectrum F(r, θ) in a θ direction has at least one local maximum value, and when an angular distribution q(θ) is calculated from the two-dimensional power spectrum F(r, θ) with respect to a frequency rp at which the one-dimensional radial distribution function p(r) takes the local maximum value, a maximum value of power values in a range of θ=0° to 15° and a range of θ=165° to 180° is a power value that is 1.15 times or larger of an average value of power values in a range of θ=16° to 164°.

* * * * *